United States Patent
Obi

(10) Patent No.: US 8,013,492 B2
(45) Date of Patent: Sep. 6, 2011

(54) ACTUATOR WITH RELATIVE GAPS FOR DRIVING ELECTRODES AND REPULSION GENERATION SECTION

(75) Inventor: Hiroshi Obi, Nara (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/120,978

(22) Filed: May 15, 2008

(65) Prior Publication Data

US 2008/0284279 A1   Nov. 20, 2008

(30) Foreign Application Priority Data

May 18, 2007   (JP) .................................. 2007-132498

(51) Int. Cl.
 *H02K 1/00* (2006.01)
 *G02B 26/08* (2006.01)
(52) U.S. Cl. ................... 310/309; 359/223.1; 359/225.1
(58) Field of Classification Search .................... 310/309
 See application file for complete search history.

(56) References Cited

U.S. PATENT DOCUMENTS

| | | | | |
|---|---|---|---|---|
| 6,065,341 A * | 5/2000 | Ishio et al. | ................. | 73/514.32 |
| 6,765,711 B2 * | 7/2004 | Min et al. | ...................... | 359/290 |
| 7,031,040 B2 * | 4/2006 | Fujii et al. | .................. | 359/199.1 |
| 7,468,826 B2 * | 12/2008 | Orcutt | ......................... | 359/226.1 |
| 2005/0162811 A1 * | 7/2005 | Obi et al. | ........................ | 361/437 |
| 2006/0039060 A1 * | 2/2006 | Yee et al. | ........................ | 359/225 |
| 2008/0022771 A1 * | 1/2008 | Wolter et al. | ............... | 73/514.38 |
| 2008/0284279 A1 * | 11/2008 | Obi | ................................ | 310/309 |

FOREIGN PATENT DOCUMENTS

JP   2004-341364   12/2004
JP   2005-205577   8/2005

* cited by examiner

*Primary Examiner* — Karl I Tamai
(74) *Attorney, Agent, or Firm* — Renner, Otto, Boisselle & Sklar, LLP

(57) ABSTRACT

According to the present invention, a stable operation of an actuator is realized. An actuator 1 according to the present invention includes: a movable section 5; a stationary section 10 for supporting the movable section 5; driving electrode portions 8 and 9 for driving the movable section 5; and a repulsion generation section 6 for generating a repulsion acting between the movable section 5 and the stationary section 10. The repulsion generation section 6 is provided at a position of the stationary section 10 opposing the movable section 5. At least a portion of the repulsion generation section 6 opposes an end of the movable section 5 that is located closer to the movable comb electrodes 9 than to hinges 7. By applying the same driving voltage to the movable section 5 and the repulsion generation section 6, a repulsion is generated. The repulsion acts in a direction of suppressing a rotation of the movable section 5 around an axis which is perpendicular to the planar direction of the movable section 5.

15 Claims, 22 Drawing Sheets

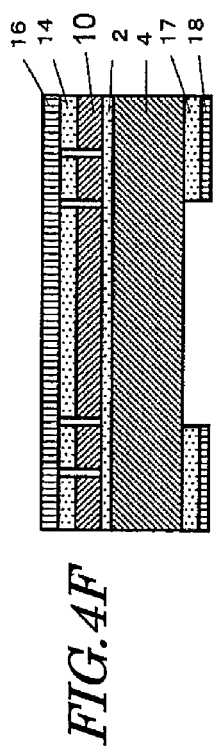
FIG.4A
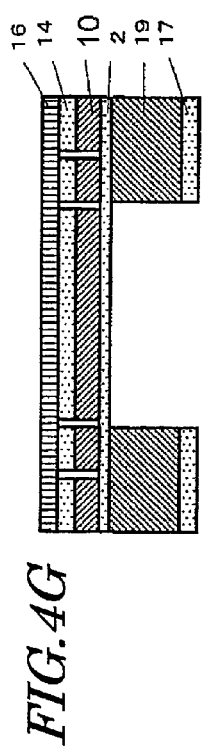
FIG.4B
FIG.4C
FIG.4D
FIG.4E
FIG.4F
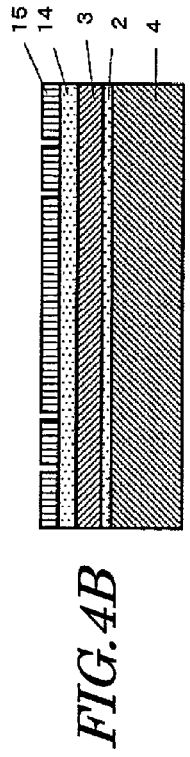
FIG.4G
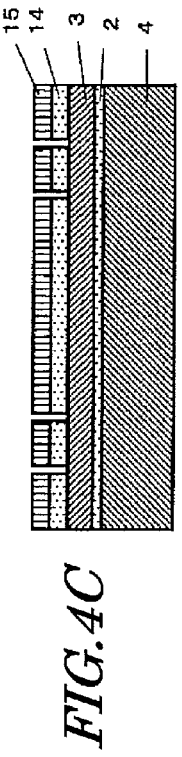
FIG.4H
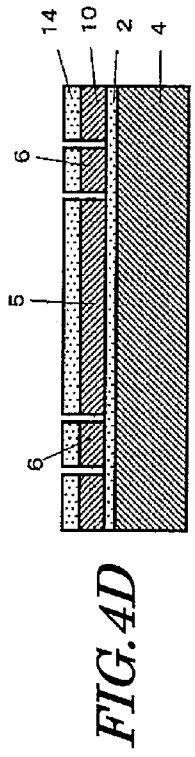
FIG.4I
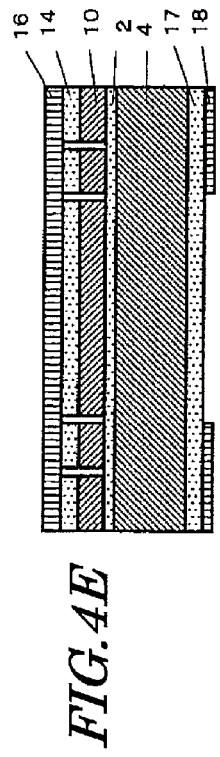
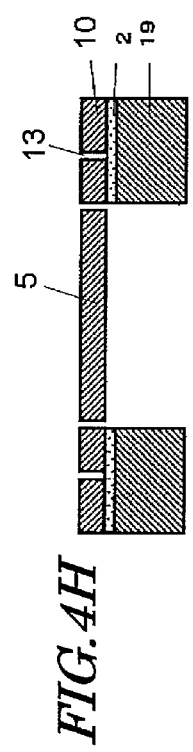
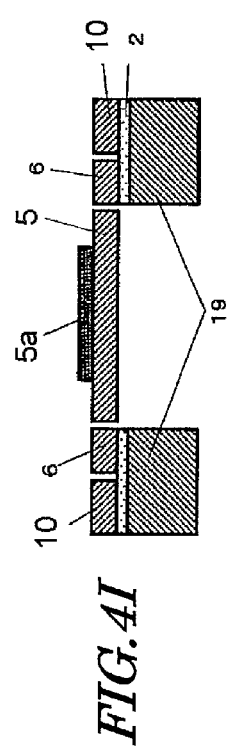

ACTUATOR WITH RELATIVE GAPS FOR DRIVING ELECTRODES AND REPULSION GENERATION SECTION

BACKGROUND OF THE INVENTION

1. Field of the Invention

The present invention relates to an actuator as a micromechanical structure to which micromachining technology is applied, for use in e.g. optical scanning apparatuses for use in laser printers and the like, reading apparatuses such as barcode readers, laser projectors, and so on.

2. Description of the Related Art

In an actuator formed by micromachining technology, for example, a movable section may be supported by hinges, such that the movable section is allowed to move due to electrostatic attraction occurring between the movable section and an electrode opposing the movable section, where the hinges serves as an axis.

As compared to conventional mechanical structures, such an actuator formed by micromachining technology has a simple structure and permits semiconductor batch processing, and therefore can be easily downsized and enable reduction of production cost. Thus, a drastic performance improving effect can be expected.

Japanese Laid-Open Patent Publication No. 2004-341364 discloses a mono-axial pivoting type oscillating mirror device in which electrostatic attraction is generated also at the walls of a mirror section, thus to minimize deformation of the mirror section during pivoting.

Japanese Laid-Open Patent Publication No. 2005-205577 discloses a mono-axial pivoting type mirror device in which electrostatic attraction is generated symmetrically with respect to an axis which is orthogonal to the pivot axis, thus to ensure stable operation.

In applications which require scanning over a broad range, e.g., scanning mirror devices for image display apparatuses or scanning mirror devices for image capturing, obtaining a large displacement of the movable section has resulted in the following problems.

A possible method for realizing a large displacement of the movable section might be to increase the electrostatic attraction which serves as a driving force, or reduce the spring modulus of the hinges. However, either method will result in the problem of a deteriorated driving stability.

Another method, which involves use of electrostatic attraction to ensure stable operation, has a problem in that balance may be lost when the movable section makes a large displacement, thus resulting in a deteriorated driving stability.

SUMMARY OF THE INVENTION

The present invention has been made in view of the aforementioned problems, and provides an actuator which attains a large amount of displacement and yet provides an excellent driving stability.

An actuator according to the present invention comprises: a movable section; a stationary section for supporting the movable section; a driving electrode portion for driving the movable section; and a repulsion generation section for generating a repulsion acting between the movable section and the stationary section.

In one embodiment, the repulsion generation section is provided at a position of the stationary section opposing the movable section; and the repulsion is generated by applying a same voltage to the movable section and to the repulsion generation section.

In one embodiment, the repulsion acts in a direction of suppressing rotation of the movable section around an axis which is perpendicular to a planar direction of the movable section.

In one embodiment, the actuator further comprises a hinge for linking the movable section and the stationary section, wherein, the driving electrode portion includes a first comb electrode provided in the movable section and a second comb electrode being provided in the stationary section and opposing the first comb electrode; and at least a portion of the repulsion generation section opposes an end of the movable section that is located closer to the first comb electrode than to the hinge.

In one embodiment, at least a portion of the repulsion generation section opposes an end of the movable section that is the farthest from a center of the movable section.

In one embodiment, the driving electrode portion includes a first comb electrode provided in the movable section and a second comb electrode being provided in the stationary section and opposing the first comb electrode; and a portion of a gap between the movable section and the repulsion generation section is narrower than a gap between the first comb electrode and the second comb electrode along a direction which is parallel to a pivot axis of the movable section.

In one embodiment, at least a portion of the movable section has elasticity, and when the movable section comes into contact with the repulsion generation section, an elastic force is generated in a direction of separating the movable section from the repulsion generation section.

In one embodiment, the repulsion generation section is symmetric with respect to a pivot axis of the movable section.

In one embodiment, the actuator further comprises a hinge for linking the movable section and the stationary section, wherein, the driving electrode portion includes a first comb electrode provided in the movable section and a second comb electrode being provided in the stationary section and opposing the first comb electrode; the movable section translates along a direction perpendicular to a direction in which the hinge extends; and a portion of a gap between the movable section and the repulsion generation section is narrower than a gap between the first comb electrode and the second comb electrode along a direction parallel to the direction in which the hinge extends.

In one embodiment, along a direction which is parallel to a translation direction of the movable section, a distance between the repulsion generation section and a portion of the movable section opposing the repulsion generation section is equal to or less than a distance between the first comb electrode and the second comb electrode.

In one embodiment, the repulsion generation section is symmetric with respect to an axis extending along the hinge.

In one embodiment, the repulsion generation section surrounds a portion of the movable section.

In one embodiment, the stationary section surrounds the movable section.

In one embodiment, at least a portion of the movable section is formed of a plate-like silicon layer.

In one embodiment, the stationary section is formed of an SOI wafer in which first and second silicon layers are bonded together via an insulating layer.

An image projection apparatus according to the present invention comprises: the aforementioned actuator; a light source for emitting a light beam; optics for guiding the light beam to the actuator; and a driving section for driving the actuator.

According to the present invention, the actuator includes a repulsion generation section for generating a repulsion acting between the movable section and the stationary section. By generating a repulsion acting between the movable section and the stationary section, it is possible to suppress mal-operation even when the movable section is caused to make a large displacement, whereby an actuator having a high operational stability is realized. As used herein, a mal-operation is a motion into a direction which is different from a driving direction. In a construction where a plate-like movable section is allowed to pivot around an axis which lies in that plane, a mal-operation may be a rotation of the movable section around an axis which is perpendicular to the planar direction of the movable section, for example, and a repulsion will act in a direction of suppressing such a rotation. Moreover, repulsion can suppress contact between the movable section and the stationary section.

Moreover, since an actuator according to the present invention can be produced through a simple production process, an actuator which attains a large amount of displacement and yet provides an excellent driving stability can be provided at low cost.

According to an embodiment of the present invention, a repulsion generation section is provided at a position of the stationary section opposing the movable section, and the aforementioned repulsion is generated by applying the same voltage to the movable section and to the repulsion generation section. As a result, mal-operation of the movable section can be suppressed by utilizing a repulsion due to electromagnetic force.

According to an embodiment of the present invention, at least a portion of the repulsion generation section opposes an end of the movable section that is located closer to the comb electrode than to the hinge. As a result, when a mal-operation occurs, repulsion is allowed to act at places of the movable section which make the most displacement, so that mal-operation can be efficiently suppressed. Moreover, at least a portion of the repulsion generation section may oppose an end of the movable section that is the farthest from the center of the movable section. With such a construction, too, mal-operation can be similarly efficiently suppressed.

According to an embodiment of the present invention, a portion of the gap between the movable section and the repulsion generation section is narrower than a gap between the comb electrode of the movable section and the comb electrode of the stationary section along a direction which is parallel to the pivot axis of the movable section. As a result, when a considerable mal-operation occurs, the movable section will come into contact with the repulsion generation section before contact between the comb electrodes can occur, so that sticking between the comb electrodes can be prevented. By applying the same driving voltage to the movable section and the repulsion generation section so that they are at the same potential, sticking between the movable section and the repulsion generation section is prevented.

According to an embodiment of the present invention, the repulsion generation section is symmetric with respect to a pivot axis of the movable section. As a result, a uniform repulsion can be generated with respect to the pivot axis of the movable section, so that the movable section is allowed to operate more stably.

According to an embodiment of the present invention, a portion of the gap between the movable section and the repulsion generation section is narrower than the gap between the comb electrode of the movable section and the comb electrode of the stationary section along a direction parallel to the direction in which the hinge extends. As a result, when a considerable mal-operation occurs, the movable section will come into contact with the repulsion generation section before contact between the comb electrodes can occur, so that sticking between the comb electrodes can be prevented.

According to an embodiment of the present invention, along a direction which is parallel to the translation direction of the movable section, the distance between the repulsion generation section and a portion of the movable section opposing the repulsion generation section is equal to or less than the distance between the comb electrode of the movable section and the comb electrode of the stationary section. As a result, when the movable section is caused to make a large translation, the movable section will come into contact with the repulsion generation section before contact between the comb electrodes can occur, so that sticking between the comb electrodes can be prevented.

According to an embodiment of the present invention, the repulsion generation section is symmetric with respect to an axis extending along the hinge. As a result, a uniform repulsion can be generated with respect to an axis extending along the hinge, so that the movable section is allowed to operate more stably.

According to an embodiment of the present invention, the repulsion generation section surrounds a portion of the movable section. As a result, a further greater repulsion can be generated for the movable section.

According to an embodiment of the present invention, the stationary section surrounds the movable section. As a result, the stationary section serves also as an outer frame of the actuator, whereby an actuator having a high structural strength can be provided.

According to an embodiment of the present invention, at least a portion of the movable section is formed of a plate-like silicon layer. As a result, by simply etching the silicon layer, the movable section, the repulsion generation section, the hinge, and the driving electrode portion can be formed, thus simplifying the production steps.

According to an embodiment of the present invention, the stationary section is formed of an SOI wafer in which first and second silicon layers are bonded together via an insulating layer. This makes it unnecessary to form a silicon layer structure having an interposed insulating layer during the production process of the actuator. As a result, the production steps can be simplified.

An image projection apparatus according to the present invention includes the aforementioned actuator. As a result, an image projection apparatus including a highly reliable scan unit capable of stable operation can be provided.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 4A to 4I are cross-sectional views showing production steps for an actuator according to an embodiment of the present invention.

DETAILED DESCRIPTION OF PREFERRED EMBODIMENTS

Hereinafter, with reference to the drawings, embodiments of the present invention will be described.

Embodiment 1

Figure 1:
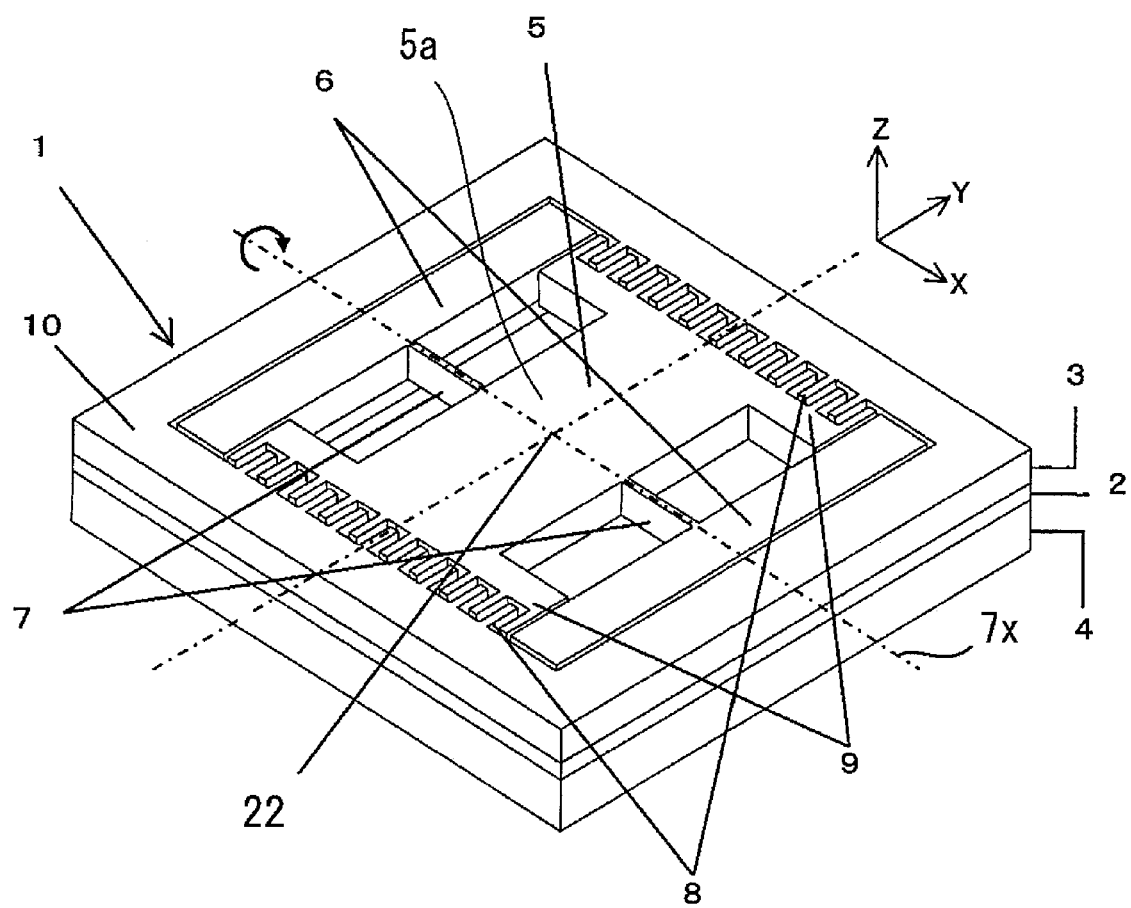
FIG. 1 is a perspective view showing an actuator according to an embodiment of the present invention.
Figure 2:
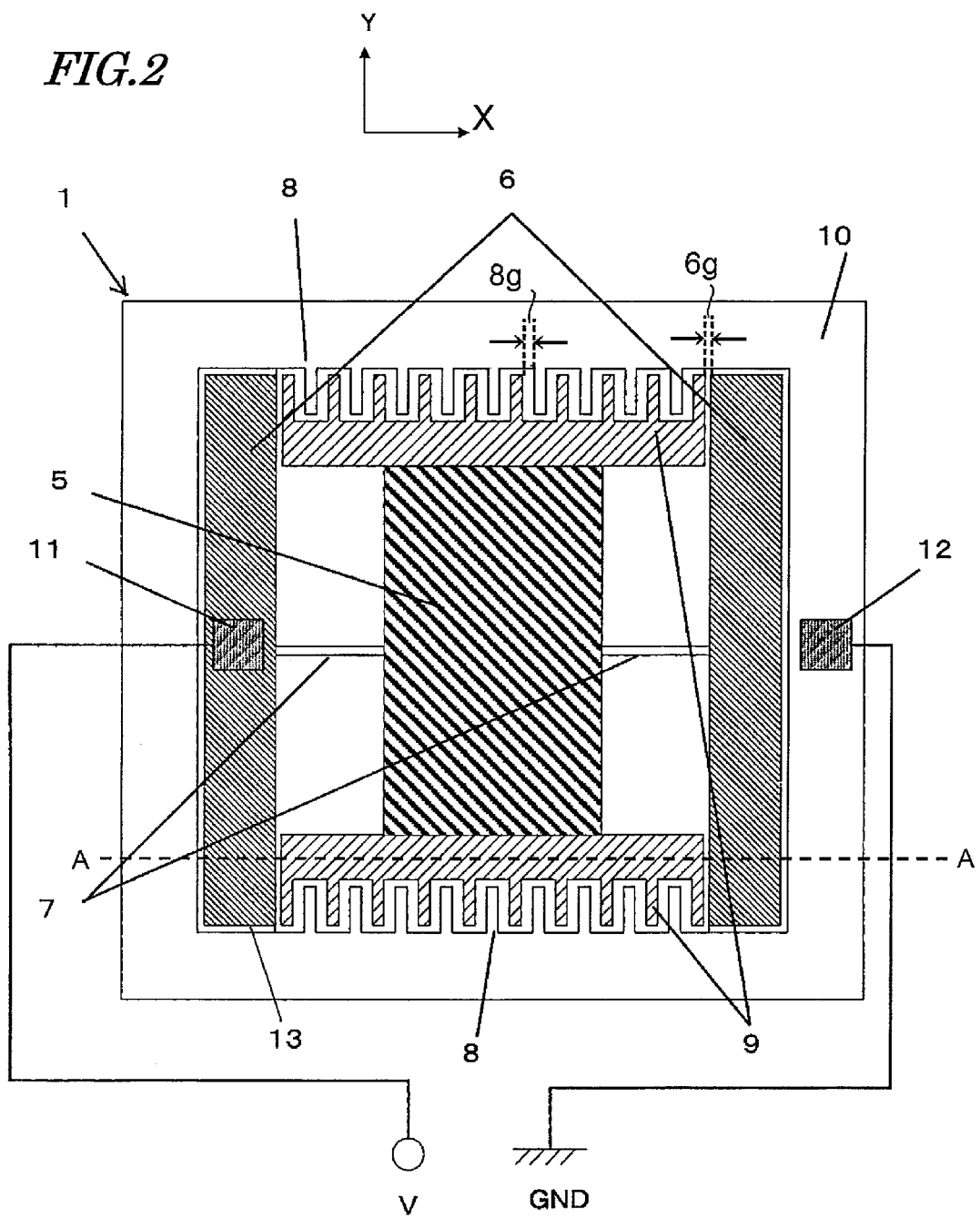
FIG. 2 is a plan view showing an actuator according to an embodiment of the present invention.

First, with reference to FIG. 1 an FIG. 2, an actuator according to a first embodiment of the present invention will be described. FIG. 1 is a perspective view showing an actuator 1 of the present embodiment. FIG. 2 is a plan view showing the actuator 1 of the present embodiment. The actuator 1 is a mono-axial pivoting type actuator.

The actuator 1 is produced by processing a wafer in which two silicon layers are bonded via an insulating layer 2 of silicon dioxide ($SiO_2$), i.e., a so-called SOI (Silicon On Insulator) wafer. The actuator 1 is a micro-mechanical structure which is produced by applying micromachining technology.

Among the two silicon layers, a plate-like first silicon layer is doped with an n type impurity such as P or As or a p type impurity such as B so that an electrical conductivity is conferred thereto, and thus is referred to as a device layer 3. A second silicon layer is a thick portion that constitutes a main portion of the wafer, and is referred to as a handle layer 4.

The actuator 1 includes a movable section 5, hinges 7, and a stationary section 10. The movable section 5 includes comb electrodes 9. The stationary section 10 includes anchor portions 6 and comb electrodes 8. The stationary section 10 surrounds the perimeter of the movable section 5. On the surface of the movable section 5, a mirror surface 5a is formed for reflecting incident light. These constituent elements are formed by subjecting the device layer 3 to an etching-based patterning described below.

Via the hinges 7, the anchor portions 6 link to and support the movable section 5, such that the movable section 5 is capable of pivoting around the hinges 7 as an axis. The hinges 7 extend along an X direction, thus resulting in a pivot axis 7x of the movable section 5 extending along the X direction. Each movable comb electrode 9 is formed along a far edge, from the pivot axis 7x, of the outer periphery of the movable section 5. Each movable comb electrode 9 has a plurality of combteeth flanking along the X direction, such that each combtooth extends along a Y direction. The stationary comb electrodes 8 are formed in the stationary section 10. Each stationary comb electrode 8 has a plurality of combteeth flanking along the X direction, such that each combtooth extends along the Y direction. Each movable comb electrode 9 and each stationary comb electrode 8 oppose each other, such that the combteeth of the movable comb electrode 9 mesh with the combteeth of the stationary comb electrode 8 via a gap. The movable comb electrodes 9 and the stationary comb electrodes 8 may be collectively referred to as a driving electrode portion. The movable section 5 is driven by a potential difference between each movable comb electrode 9 and each stationary comb electrode 8.

From the position where it is connected to a hinge 7, each anchor portion 6 extends along the Y direction to positions opposing the movable comb electrodes 9. The edge portions of the movable comb electrodes 9 lying adjacent to the anchor portions 6 correspond to the edge portions of the movable section 5 that are the farthest from a center 22 of the movable section 5. Edge portions of the anchor portions 6 extend adjacent and in parallel to these edge portions of the movable comb electrodes 9. Adjacent edge portions extend so as to be at a constant distance from each other. A portion 6g of the gap between the movable section 5 and each anchor portion 6 is narrower than a gap 8g along a direction parallel to the pivot axis 7x (i.e., the X direction) between one combtooth of each movable comb electrode 9 and one combtooth of the corresponding stationary comb electrode 8. The anchor portions 6 function as a repulsion generation section for generating a repulsion acting between the movable section 5 and the stationary section 10. The detailed operation for generating repulsion will be described later.

Isolation trenches 13 are formed in the device layer 3, so that the gaps and the isolation trenches 13 electrically divide the device layer 3 into two regions. Specifically, the anchor portions 6, the hinges 7, and the movable section 5 are all electrically connected. Although the anchor portions 6 are constituent elements of the stationary section 10, the anchor portions 6 are electrically insulated from the stationary comb electrodes 8 by the isolation trenches 13.

When a driving voltage V is applied to a movable electrode pad 11 which is provided on an anchor portion 6, the driving voltage V is applied to the movable section 5 via the anchor portion 6 and a hinge 7. Via the moving section 5 and the hinges 7, the driving voltage V thus applied to the one anchor portion 6 also reaches the other anchor portion 6. When a ground pad 12 which is provided on the stationary section 10 is set to the ground level (GND), the driving voltage V defines a potential difference between the movable comb electrodes 9 and the stationary comb electrodes 8. When the driving voltage V is appropriately controlled, the movable section 5 undergoes a resonation operation at its resonant frequency.

Figure 3:
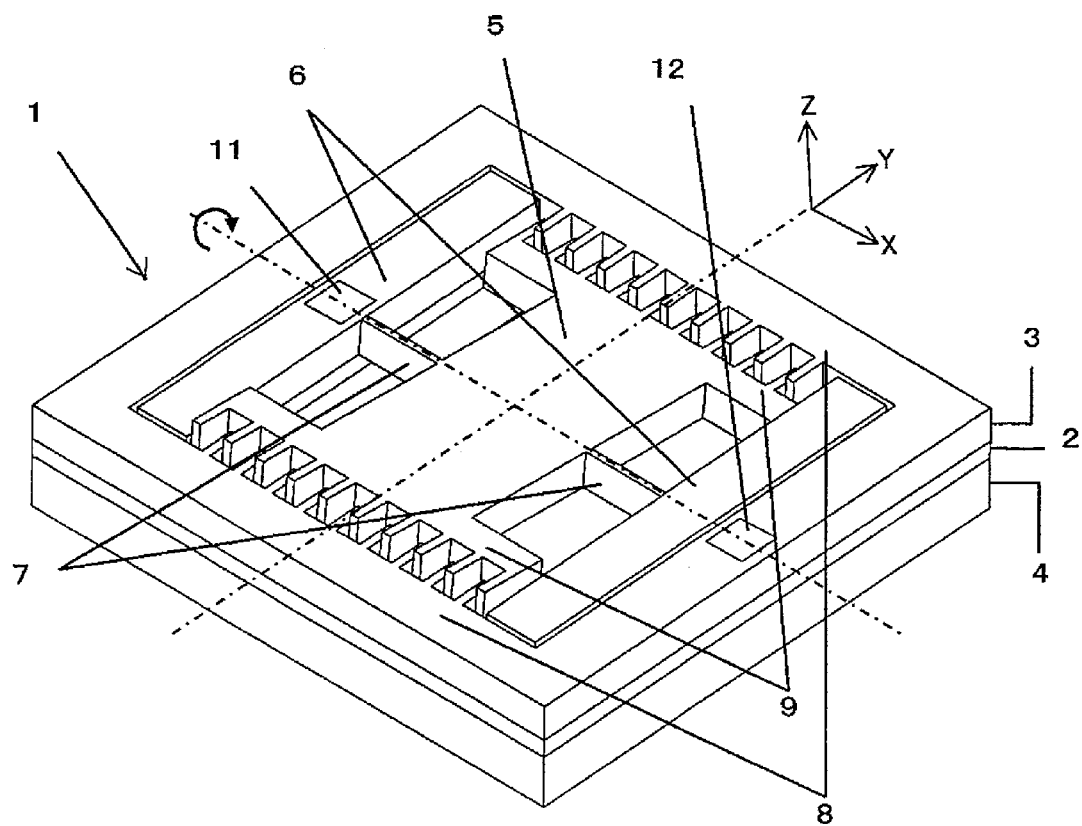
FIG. 3 is a perspective view showing an actuator according to an embodiment of the present invention which is in operation.

FIG. 3 is a perspective view showing the actuator 1 in operation. The movable section 5 pivots relative to the stationary section 10 around the hinges 7. As a result, light having been reflected at the movable section 5 is subjected to one-dimensional scanning.

Moreover, since the same driving voltage V is applied to the anchor portions 6 and the movable section 5, a repulsion occurs between the anchor portions 6 and the movable section 5. This repulsion is a repulsion occurring between electric charges of the same polarity. Thus, the anchor portions 6 functions as a repulsion generation section for generating a repulsion acting between the movable section 5 and the stationary section 10.

Figure 5:
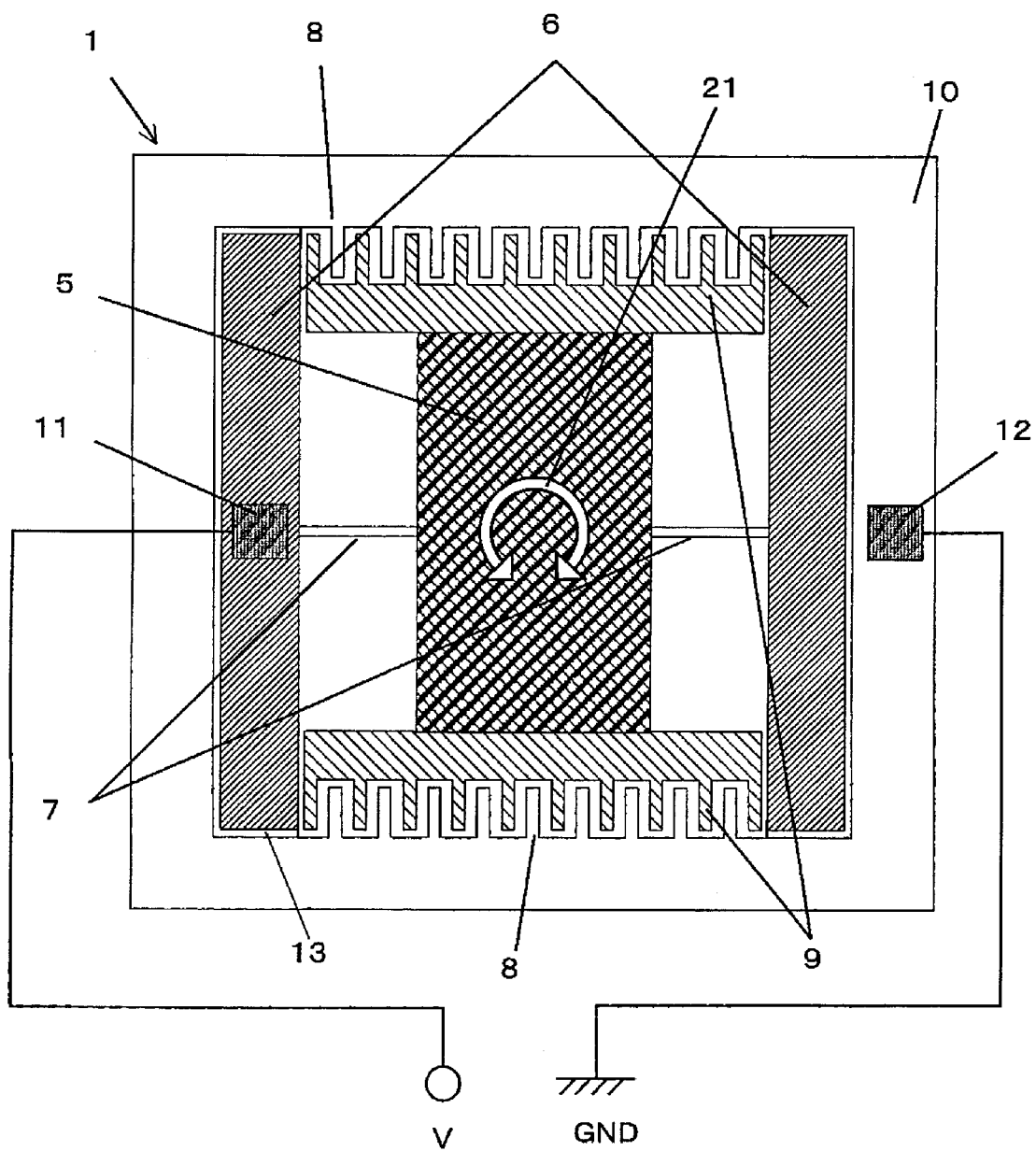
FIG. 5 is a plan view illustrating a mal-operation relative to an actuator according to an embodiment of the present invention.

By generating a repulsion acting between the movable section 5 and the stationary section 10, it is possible to suppress mal-operation even when the movable section 5 is caused to make a large displacement, whereby an actuator 1 having a high operational stability is realized. Referring to FIG. 5, a mal-operation is a rotation 21 of the movable section 5 around an axis (Z direction axis) which is perpendicular to the planar direction (X-Y directions) of the movable section 5, for example. Repulsion will act in a direction of suppressing such a rotation 21. Moreover, repulsion can suppress contact between the movable section 5 and the stationary section 6, thus suppressing sticking between the movable comb electrodes 9 and the stationary comb electrodes 8.

Moreover, at least a portion of each anchor portion 6 opposes an end of the movable section 5 that is located closer to the movable comb electrodes 9 than to the hinges 7. More specifically, at least a portion of each anchor portion 6 opposes an end of the movable section 5 that is the farthest from the center 22 of the movable section 5. As a result, when a mal-operation occurs, repulsion is allowed to act at places of the movable section 5 which make the most displacement, so that the mal-operation can be efficiently suppressed.

The anchor portions 6 are shaped so as to be symmetric with respect to the pivot axis 7*x* of the movable section 5 (FIG. 1). As a result, a uniform repulsion can be generated with respect to the pivot axis 7*x*, so that the movable section 5 is allowed to operate more stably.

Moreover, a portion 6*g* of the gap between the movable section 5 and each anchor portion 6 (FIG. 2) is narrower than the gap 8*g* along the X direction between one combtooth of each movable comb electrode 9 and one combtooth of the corresponding stationary comb electrode 8. As a result, when a considerable mal-operation occurs, the movable section 5 will come into contact with the anchor portion(s) 6 before contact between the comb electrodes can occur. Thus, contact and sticking between the comb electrodes can be prevented. Since the same driving voltage is applied to the movable section 5 and the anchor portions 6 so that they are at the same potential, even when the movable section 5 comes into contact with the anchor portions 6, a repulsion will act so as to pull them apart. As a result, sticking between the movable section 5 and the anchor portions 6 is prevented.

Next, with reference to FIGS. 4A to 4I, a method of producing the actuator 1 will be described. FIG. 4A to FIG. 4I are cross-sectional views showing a method of producing the actuator 1, corresponding to an A-A cross section of the actuator 1 shown in FIG. 2.

With reference to FIG. 4A, an SOI wafer 20 is provided. The thickness of the device layer 3, which defines the thickness of the movable section 5, is determined by taking into consideration the resonant frequency, oscillation amplitude responsive to a driving voltage, rigidity, etc. of the movable section 5. Herein, it is assumed that there is a device layer 3 of 50 μm, an insulating layer 2 of 2 μm, and a handle layer 4 of 300 μm.

First, the device layer 3 is doped with an n type impurity such as P or As or a p type impurity such as B, so that an electrical conductivity is conferred thereto.

Next, with reference to FIG. 4B, by CVD (Chemical Vapor Deposition), an oxide layer 14 is formed on the surface of the device layer 3, a photoresist in liquid form is formed into a film by spin coating, and, through exposure and development, a resist pattern 15 is formed. As the photoresist, AZP4210 or AZ1500 (manufactured by Clariant (Japan) K.K.) may be used, for example. Any later resist pattern is also formed through such photoresist film formation followed by exposure and development.

Next, with reference to FIG. 4C, the oxide layer 14 is etched with BHF (buffered hydrofluoric acid), by using the resist pattern 15 as a mask.

Next, with reference to FIG. 4D, the resist pattern 15 is removed, and the silicon of the device layer 3 is through-etched down to the insulating layer 2 via Deep-RIE (Reactive Ion Etching), by using the oxide layer 14 as a mask. As a result, the movable section 5, the anchor portions 6, the hinges 7, the stationary comb electrodes 8, the movable comb electrodes 9, and the stationary section 10 are formed.

In the Deep-RIE, through a Bosch process where etching and side wall protection are alternately performed, etching with an $SF_6$ gas and side wall protection with a $C_4F_8$ gas are performed. These conditions can be adopted also in any later Deep-RIE for the silicon layers.

Next, with reference to FIG. 4E, by using a photoresist in liquid form, a protection layer 16 is formed by spin coating. Oxide is deposited on the surface of the handle layer 4 by CVD to form an oxide layer 17, on which a photoresist in liquid form is formed into a film by spin coating, and through exposure and development, a resist pattern 18 is formed.

Next, with reference to FIG. 4F, the oxide layer 17 is etched with BHF, by using the resist pattern 18 as a mask.

Next, with reference to FIG. 4G, the resist pattern 18 is removed, and the silicon of the handle layer 4 is through-etched down to the insulating layer 2 via Deep-RIE, by using the oxide layer 17 as a mask. As a result, a handling frame 19 for the stationary section 10 is formed from the handle layer 4.

Next, with reference to FIG. 4H, the protection layer 16 is removed. Moreover, the exposed insulating layer 2 and oxide film patterns 14 and 17 are removed, thus releasing the movable section 5. Isolation trenches 13 are formed between portions of the stationary section 10 where the stationary comb electrodes 8 are formed and the anchor portions 6, whereby the stationary comb electrodes 8 are electrically isolated from the anchor portions 6. The portions of the stationary section 10 where the stationary comb electrodes 8 are formed and the anchor portions 6 are fixed on the insulating layer 2, and they constitute the stationary section 10.

Next, with reference to FIG. 4I, aluminum, gold, or silver of a thickness of 50 nm is formed on the surface of the movable section 5 via vacuum evaporation, thus forming the mirror surface 5*a* for reflecting light. The material of the light reflecting film forming the mirror surface 5*a* is appropriately selected in view of the wavelength of the light to be used and the necessary reflectance.

Thus, with a device structure which is obtained through the simple production process of through-etching the device layer 3 to form the isolation trenches 13, the mal-operation 21 as illustrated in FIG. 5 can be suppressed.

Figure 6:
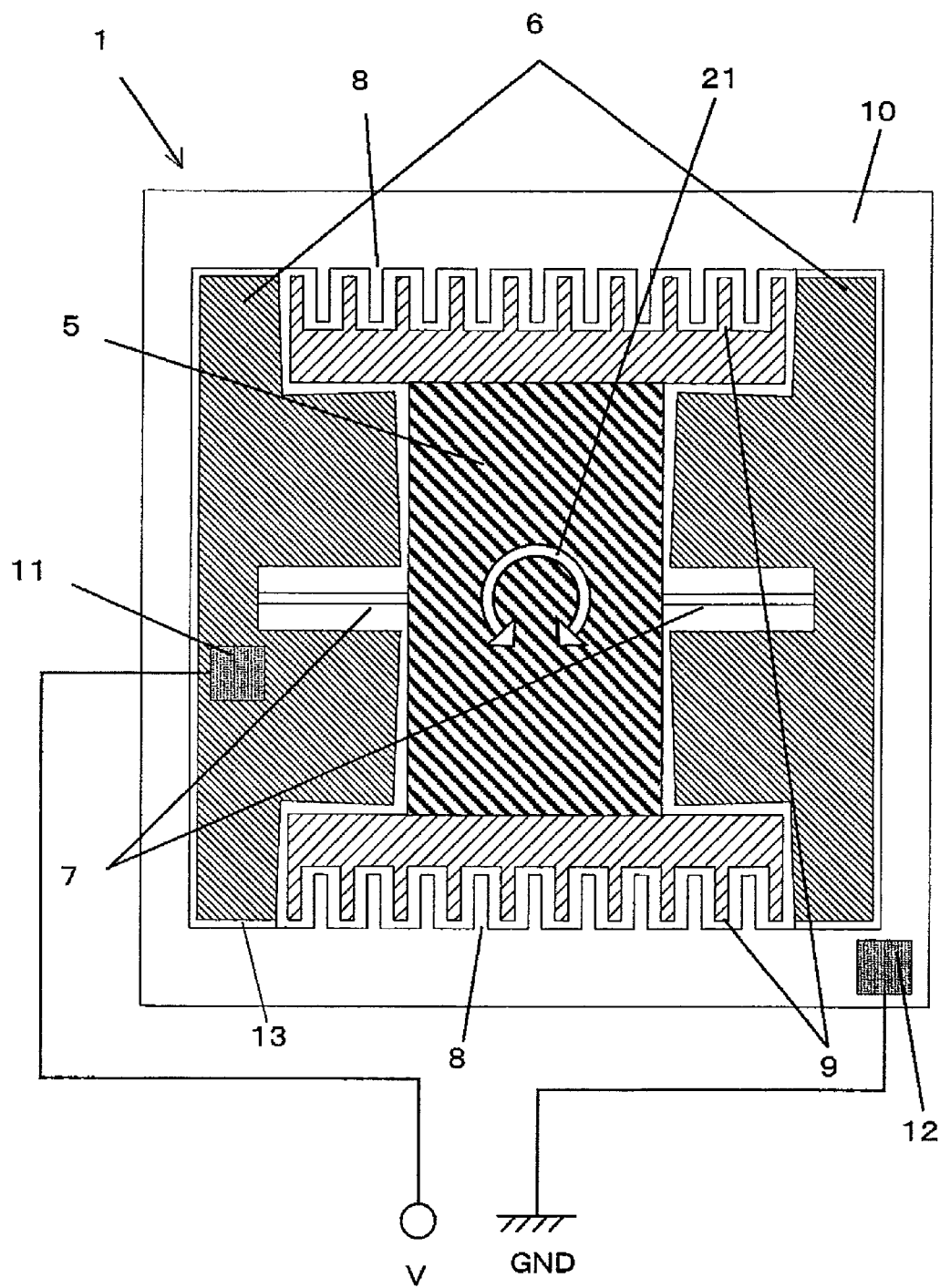
FIG. 6 is a plan view showing an actuator according to an embodiment of the present invention.
Figure 7:
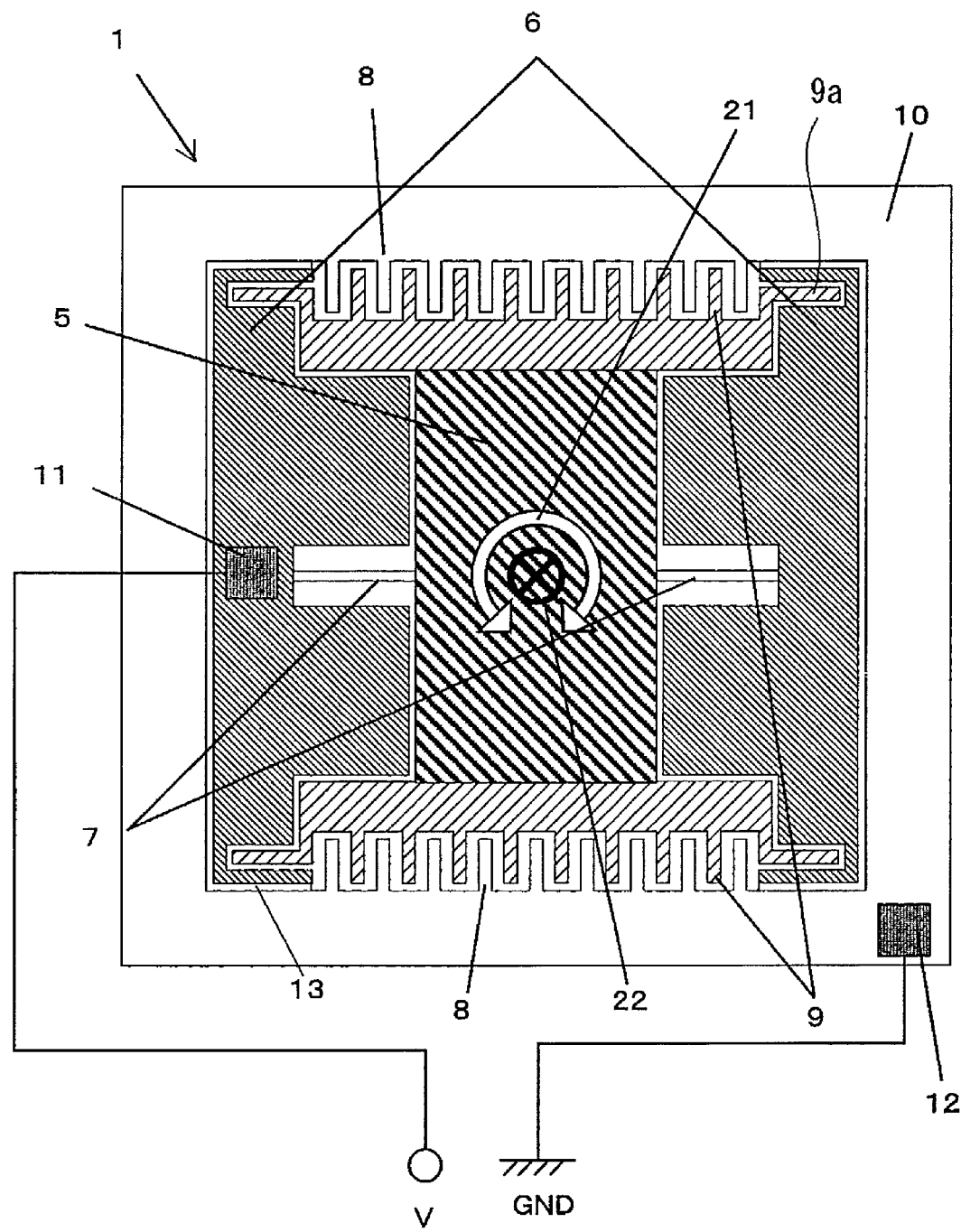
FIG. 7 is a plan view showing an actuator according to an embodiment of the present invention.
Figure 8:
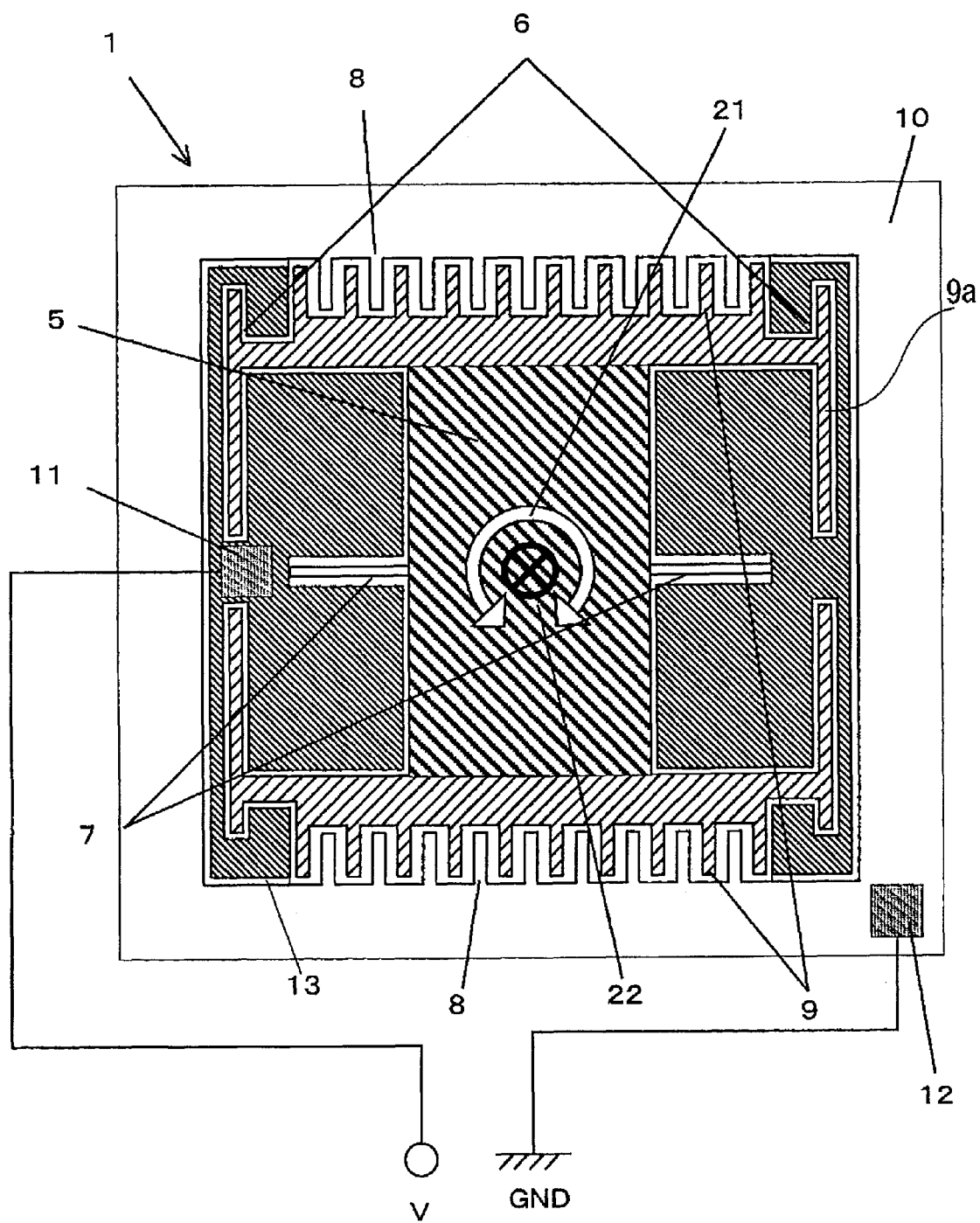
FIG. 8 is a plan view showing an actuator according to an embodiment of the present invention.

Next, with reference to FIG. 6, FIG. 7, and FIG. 8, other exemplary shapes of the movable section 5 and the anchor portions 6 will be described. FIG. 6, FIG. 7, and FIG. 8 are plan views showing the actuator 1.

In the example shown in FIG. 6, the gap between the movable section 5 and each anchor portion 6 is not constant, but tapered so that, when a mal-operation 21 occurs, a narrowed constant gap will exist between the movable section 5 and each anchor portion 6 having come closer together. With such shapes, a repulsion can be uniformly generated across a broad range when the movable section 5 and the anchor portions 6 have come closer together.

In the example shown in FIG. 7, the movable section has portions 9a which extend farther away from the center 22, each of whose perimeter is surrounded by an anchor portion 6. This makes it possible to restrain the movable section 5 from being drawn toward the stationary comb electrodes 8 by an electrostatic attraction. Even if the movable section 5 were drawn toward the stationary comb electrodes 8 by an electrostatic attraction, the anchor portions 6 will come into contact with the portion(s) 9a of the movable section 5 before coming into contact with the stationary comb electrodes 8, so that sticking between the movable section 5 and the stationary comb electrodes 8 can be prevented. Moreover, by surrounding the portions 9a of the movable section 5 with the anchor portions 6, it becomes possible to allow repulsion to act more sensitively against the rotation 21 of the movable section 5. Moreover, the movable section 5 having been deformed through such a contact will have an elastic force to restore its original shape, this also acting as a repulsion force to pull the movable section 5 and the stationary section 10 apart. For example, the portions 9a of the movable section 5 may have elasticity, such that each portion 9a of the movable section 5 is deformed when the portion 9a of the movable section 5 comes into contact with an anchor portion 6, thus generating an elastic force in a direction of separating the portion 9a of the movable section 5 from the anchor portion 6.

In the example shown in FIG. 8, as compared to the example shown in FIG. 7, there are larger portions 9a of the movable section that are surrounded by the anchor portions 6. As a result, it is possible to allow repulsion to act more sensitively and to a greater extent against a mal-operation 21 of the movable section 5.

Thus, with a repulsion which is obtained by applying the same driving voltage to the anchor portions 6 and the movable section 5, the movable section 5 can operate stably.

Figure 9:
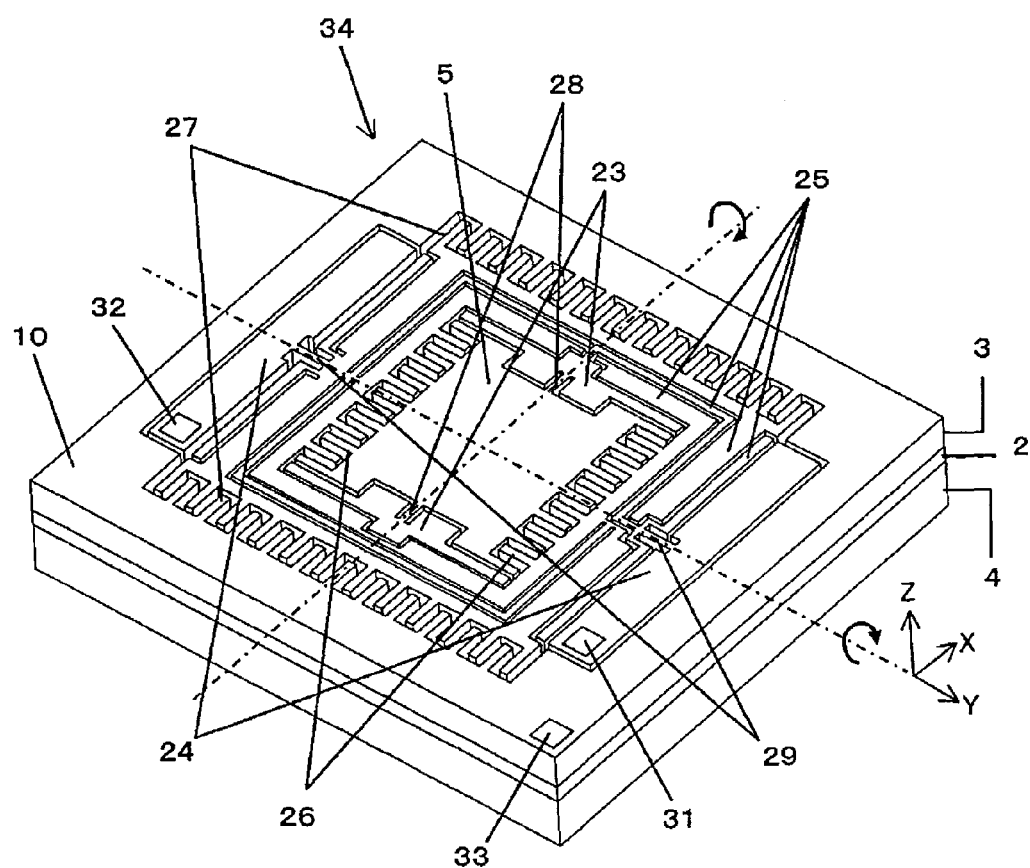
FIG. 9 is a perspective view showing a bi-axial pivoting type actuator according to an embodiment of the present invention.
Figure 10:
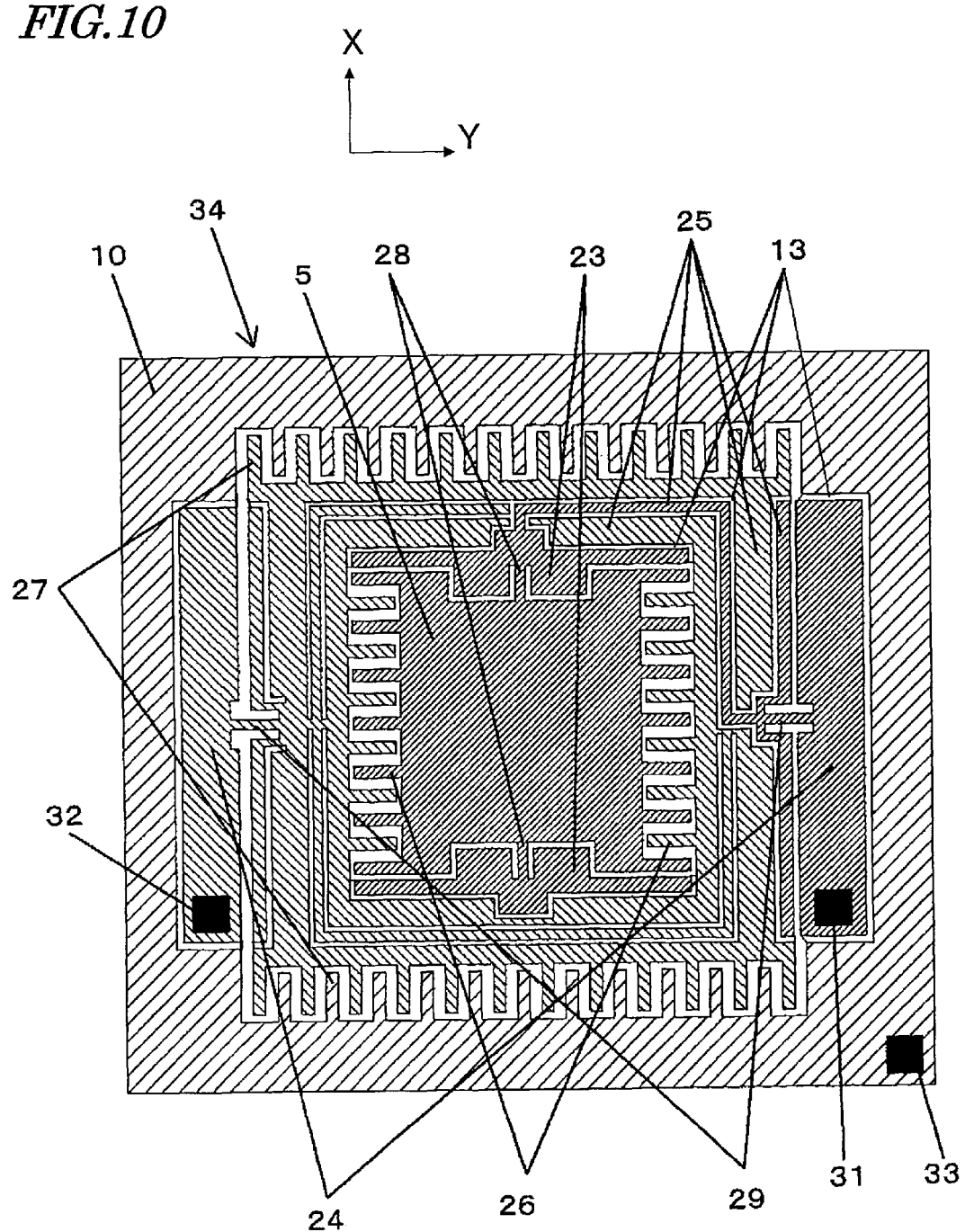
FIG. 10 is a plan view showing a bi-axial pivoting type actuator according to an embodiment of the present invention.

Next, with reference to FIG. 9 and FIG. 10, a bi-axial pivoting type actuator having a repulsion generation section will be described. FIG. 9 is a perspective view showing a bi-axial pivoting type actuator 34. FIG. 10 is a plan view showing the bi-axial pivoting type actuator 34. By performing the aforementioned etching-based patterning process for the device layer 3, a movable section 5 and an intermediate frame portion 25 are formed.

The intermediate frame portion 25 includes X-axis anchor portions 23. Via X-axis hinges 28, X-axis anchor portions 23 link to and support the movable section 5. At the outer periphery of the movable section 5 and at the inner periphery of the intermediate frame portion 25, X-axis comb electrodes 26 are formed. The X-axis comb electrodes 26 of the movable section 5 mesh with the X-axis comb electrodes 26 of the intermediate frame portion 25 each with a gap therebetween.

The stationary section 10 includes Y-axis anchor portions 24. Via Y-axis hinges 29, the Y-axis anchor portions 24 link to and support the intermediate frame portion 25. At the outer periphery of the intermediate frame portion 25 and at the inner periphery of the stationary section 10, Y-axis comb electrodes 27 are formed. The Y-axis comb electrodes 27 of the intermediate frame portion 25 mesh with the Y-axis comb electrodes 27 of the stationary section 10 each with a gap therebetween.

An X-axis movable electrode pad 31 is provided on the Y-axis anchor portion 24 on the right-hand side in FIG. 10, so as to be electrically connected to the X-axis anchor portions 23 and the movable section 5. A Y-axis movable electrode pad 32 is provided on the Y-axis anchor portion 24 on the left-hand side in FIG. 10, so as to be electrically connected to the X-axis comb electrodes 26 of the intermediate frame portion 25. A ground pad 33 is provided on the stationary section 10.

Isolation trenches 13 are formed between the stationary section 10 and the intermediate frame portion 25, and between the intermediate frame portion 25 and the movable section 5, whereby the device layer 3 is electrically divided into three regions. By setting the ground pad 33 to the ground level (GND), and independently applying separate driving voltages to the X-axis movable electrode pad 31 and the Y-axis movable electrode pad 32, the movable section 5 and the intermediate frame portion 25 are allowed to pivot. Note that the movable section 5 may be referred to as a first movable section, and the intermediate frame portion 25 may be referred to as a second movable section.

Figure 11:
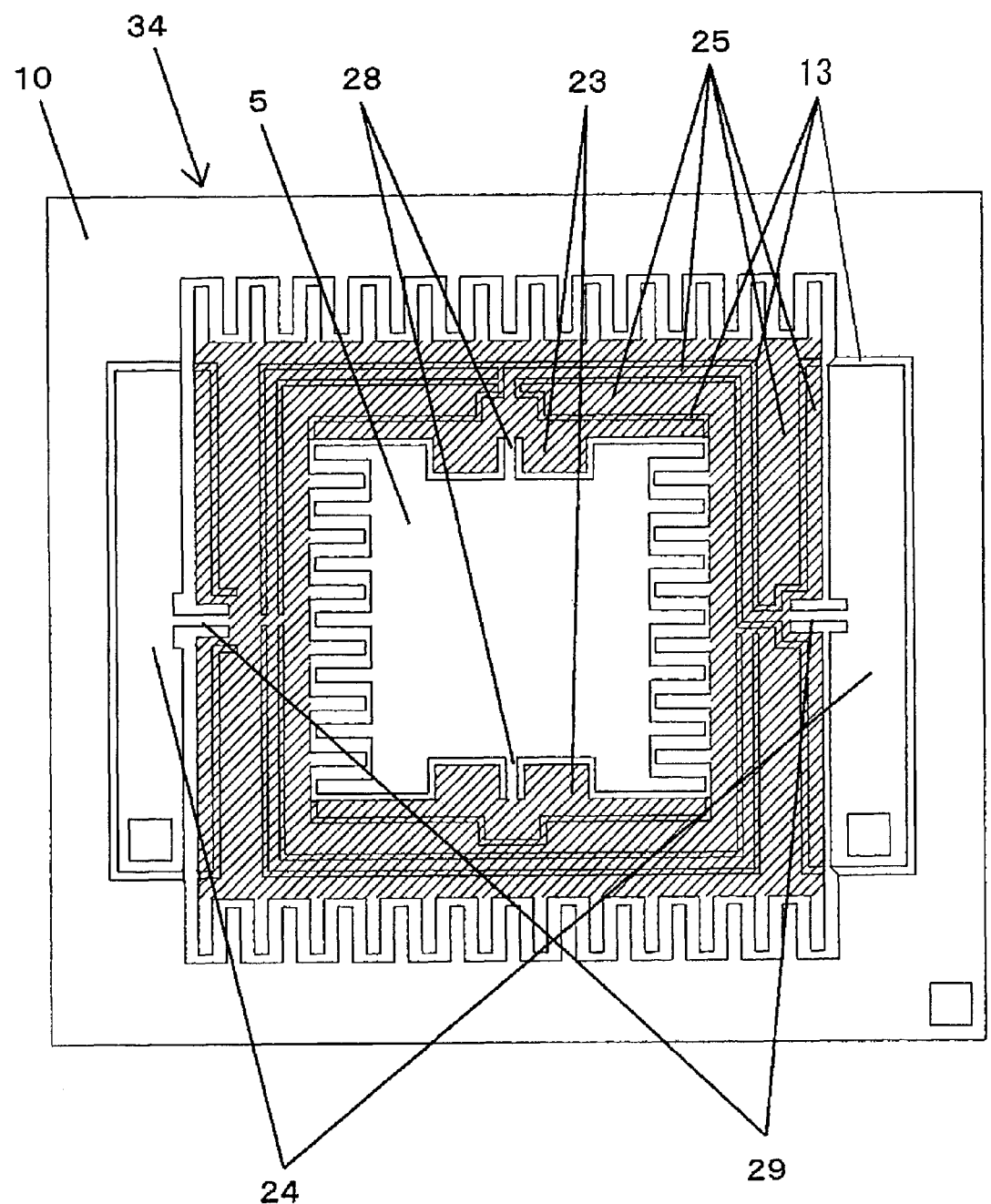
FIG. 11 is a plan view showing backlining of a bi-axial pivoting type actuator according to an embodiment of the present invention.

FIG. 11 is a plan view showing backlining of the bi-axial pivoting type actuator 34. During production of the actuator 34, a portion of the insulating layer 2 underlying the intermediate frame portion 25 that corresponds to the hatched area in FIG. 11 is left intact without being etched. The insulating layer 2 left in this hatched area is the backlining. The isolation trenches 13 in the intermediate frame portion 25 are provided within the region of this backlining. Although the constituent elements of the intermediate frame portion 25 are electrically isolated by the isolation trenches 13 as necessary, the constituent elements are mechanically fixed onto the backlining, so that the constituent elements are able to pivot integrally as the intermediate frame portion 25.

Figure 12:
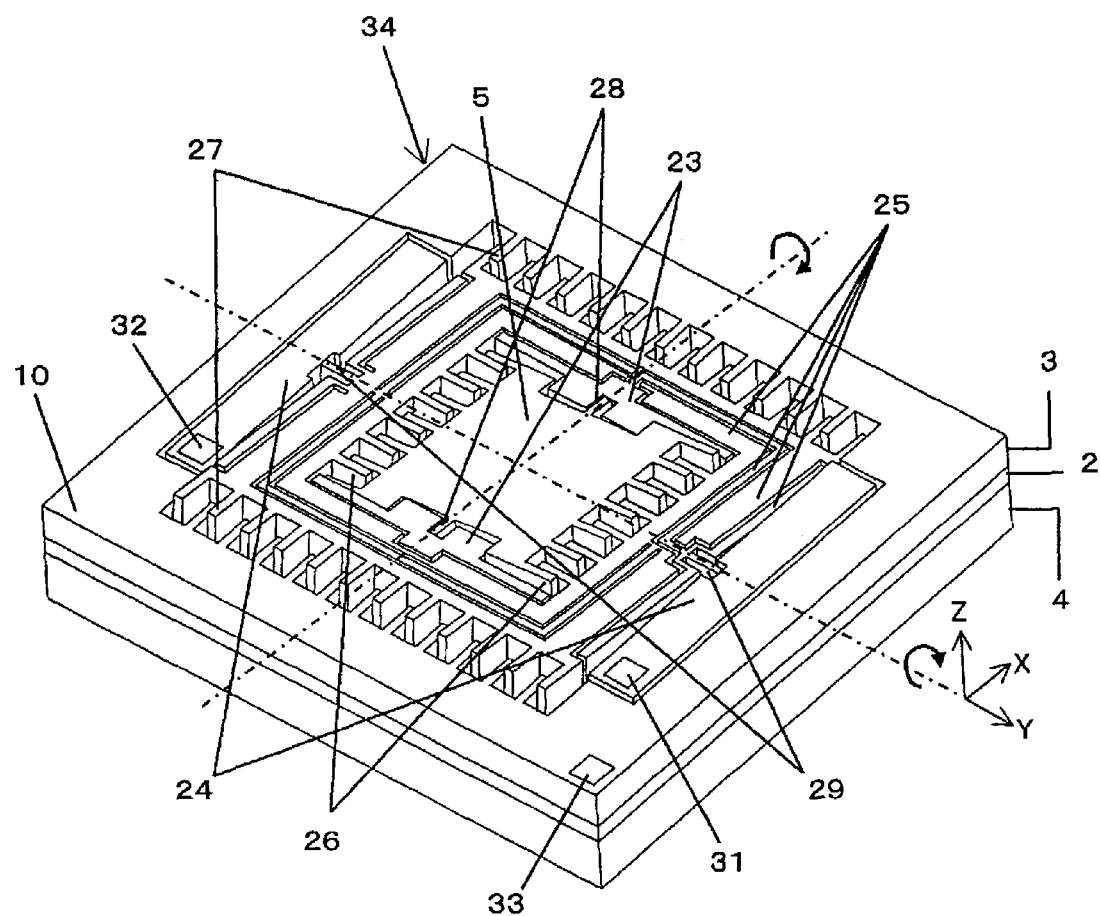
FIG. 12 is a perspective view showing a bi-axial pivoting type actuator according to an embodiment of the present invention which is in operation.

FIG. 12 is a perspective view showing the actuator 34 in operation. In accordance with a driving voltage which is applied to the X-axis movable electrode pad 31, the movable section 5 pivots relative to the intermediate frame portion 25 around the X-axis hinges 28. In accordance with a driving voltage which is applied to the Y-axis movable electrode pad 32, the intermediate frame portion 25 pivots relative to the stationary section 10 around the Y-axis hinges 29. Since the pivot axis of the movable section 5 is orthogonal to the pivot axis of the intermediate frame portion 25, a bi-axial pivoting type actuator is realized.

Since the same driving voltage is applied to the movable section 5 and the X-axis anchor portions 23, a repulsion acts between the movable section 5 and the X-axis anchor portions 23. The X-axis anchor portions 23 function as a repulsion generation section that generates a repulsion to act between the movable section 5 and the intermediate frame portion 25, thus suppressing mal-operation of the movable section 5.

Since the same driving voltage is applied to the portions of the intermediate frame portion 25 opposing the Y-axis anchor portions 24 and to the Y-axis anchor portions 24, a repulsion acts between the intermediate frame portion 25 and the Y-axis anchor portions 24. The Y-axis anchor portions 24 function as a repulsion generation section that generates a repulsion to act between the intermediate frame portion 25 and the stationary section 10, thus suppressing mal-operation of the intermediate frame portion 25.

Note that the construction of the bi-axial pivoting type actuator 34 shown in FIG. 9 is only exemplary, and is not limiting. For example, by arranging the pivot axis of the movable section 5 and the pivot axis of the intermediate frame portion 25 so as to be parallel, it becomes possible to cause a greater pivot in one direction. By arranging the pivot axis of the movable section 5 and the pivot axis of the intermediate frame portion 25 so as to be coaxial and allowing them to simultaneously pivot in one direction, it becomes possible to reduce the driving voltage for the actuator 34, thus realizing a low voltage driving.

The above-illustrated actuators 1 and 34 may be used as an optical scanning section of an optical-scanning type image projection apparatus, a laser printer, a scanner, a bar-code reader, an optical-scanning type sensor system, or the like, for example.

Although the above-illustrated actuators 1 and 34 utilize a repulsion occurring between electric charges of the same polarity, it would also be possible to utilize a magnetic repulsion occurring between opposing constituent elements of the same magnetic pole.

Embodiment 2

Figure 13:
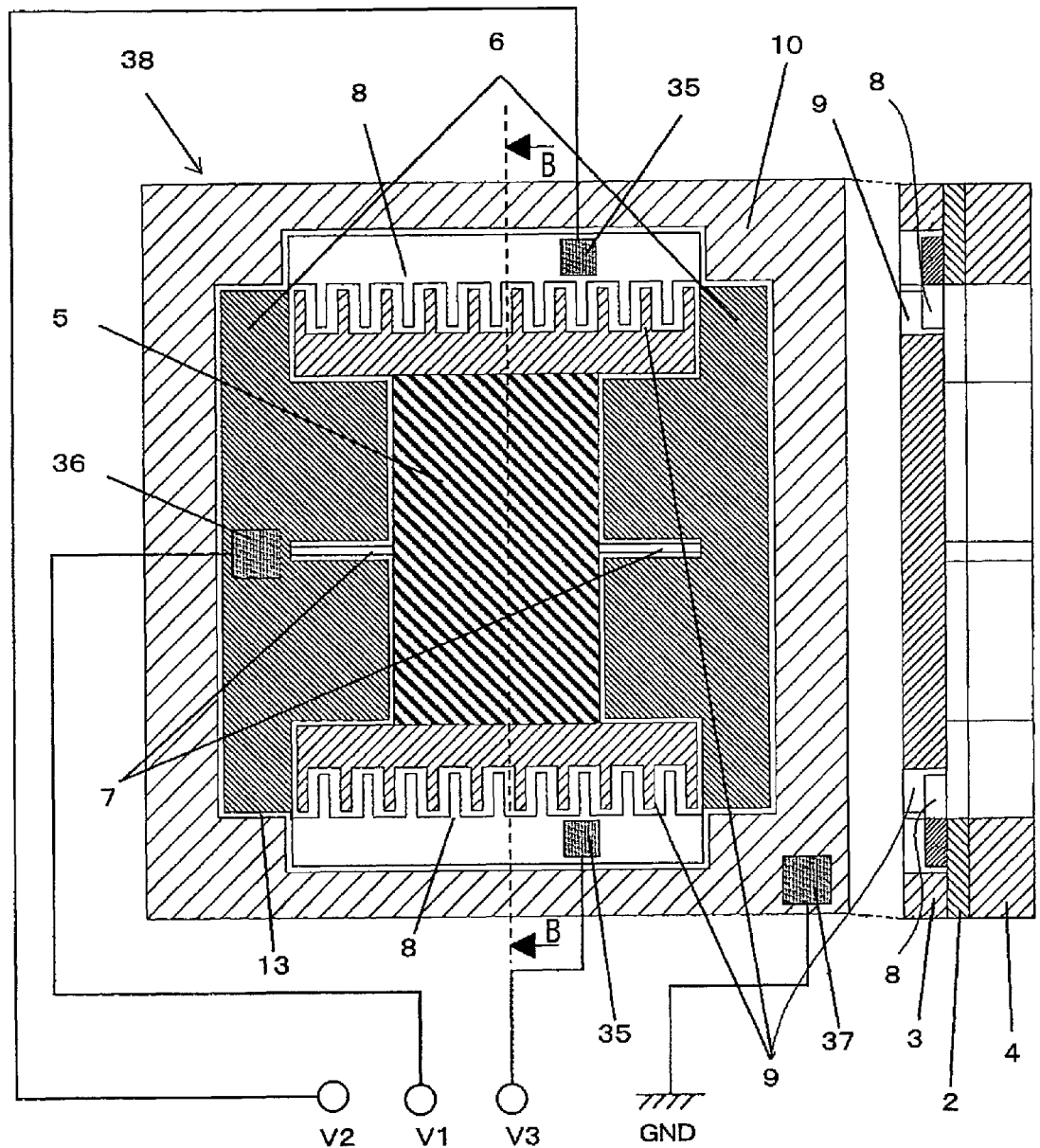
FIG. 13 is a plan view and a cross-sectional view showing an actuator according to an embodiment of the present invention.

FIG. 13 is a diagram showing a mono-axial pivoting type actuator 38 according to a second embodiment of the present invention. At the left-hand side of FIG. 13 is shown a plan view of the actuator 38; at the right-hand side is shown a cross-sectional view corresponding to a B-B cross section in the plan view.

With reference to FIG. 13, the actuator 38 is produced by processing a wafer in which two silicon layers are bonded via an insulating layer 2 of silicon dioxide ($SiO_2$), i.e., a so-called SOI (Silicon On Insulator) wafer.

Among the two silicon layers, a first silicon layer is doped with an n type impurity such as P or As and a p type impurity such as B so that an electrical conductivity is conferred thereto, and thus is referred to as a device layer 3. A second silicon layer is a thick portion that constitutes a main portion of the wafer, and is referred to as a handle layer 4. By subjecting the device layer 3 to an etching-based patterning, a movable section 5, hinges 7, and a stationary section 10 are formed.

Via the hinges 7, the anchor portions 6 link to and support the movable section 5, such that the movable section 5 is capable of pivoting around the hinges 7 as an axis. Each movable comb electrode 9 is formed along a far edge, from the pivot axis, of the outer periphery of the movable section 5. The stationary section 10 includes stationary comb electrodes 8 which mesh with the movable comb electrodes 9 each with a gap therebetween. Driving voltages are independently applied to the movable comb electrodes 9 and to the stationary comb electrodes 8.

In the actuator 38, along the thickness direction of the device layer 3, the stationary comb electrodes 8 are situated below the respective movable comb electrodes 9. Such a structure can be formed by performing two steps of etching in a Deep-RIE etching process.

A stationary electrode pad 35 is provided on each of the stationary comb electrodes 8. A movable electrode pad 36 is provided on an anchor portion 6. A ground pad 37 is provided in the portion of the stationary section 10 other than the anchor portions 6 and the stationary comb electrodes 8 (i.e., the outer frame portion). A driving voltage V1 is applied to the movable electrode pad 36. A driving voltage V2 is applied to one of the two stationary electrode pads 35, whereas a driving voltage V3 is applied to the other. The ground pad 37 is set to the ground level (GND). A potential difference between the driving voltage V1 and the driving voltage V2, or a potential difference between the driving voltage V1 and the driving voltage V3, defines a potential difference between each movable comb electrode 9 and the corresponding stationary comb electrode 8.

The edge portions of the movable comb electrodes 9 lying adjacent to the anchor portions 6 correspond to the edge portions of movable section 5 that are the farthest from a center 22 of the movable section 5. Edge portions of the anchor portions 6 extend adjacent and in parallel to these edge portions of the movable comb electrodes 9. Adjacent edge portions extend so as to be at a constant distance from each other. A portion of the gap between the movable section 5 and each anchor portion 6 is narrower than a gap along a direction parallel to the pivot axis of the movable section 5 between one combtooth of each movable comb electrode 9 and one combtooth of the corresponding stationary comb electrode 8. The anchor portions 6 function as a repulsion generation section for generating a repulsion acting between the movable section 5 and the stationary section 10.

Isolation trenches 13 are formed in the device layer 3, so that the constituent elements are electrically isolated by the isolation trenches 13 as necessary. The stationary comb electrodes 8 are electrically isolated from the outer frame portion of the stationary section 10. Also, the two stationary comb electrodes 8 are electrically isolated from each other. The anchor portions 6, the hinges 7, and the movable section 5 are electrically connected.

With a repulsion generated by applying the same driving voltage V1 to the movable section 5 and the anchor portions 6, the movable section 5 can operate stably. The movable section 5 pivots relative to the stationary section 10 around the hinges 7, whereby light having been reflected from the movable section 5 is subjected to one-dimensional scanning. By setting arbitrary potential differences between the stationary comb electrodes 8 and the movable comb electrodes 9, the movable section 5 is allowed to pivot to an arbitrary position.

Note that the shapes of the movable section 5 and the anchor portions 6 shown in FIG. 13 are only exemplary, and are not limiting. For example, as shown in FIG. 6, the gap between the movable section 5 and each anchor portion 6 may not be constant, but tapered so that, when a rotation 21 occurs, a narrowed constant gap will exist between the movable section 5 and each anchor portion 6 having come closer together. With such shapes, a repulsion can be uniformly generated across a broad range when the movable section 5 and the anchor portions 6 have come closer together.

Moreover, portions of the movable section 5 may be shaped so as to extend into the anchor portions 6 as shown in FIG. 7 and FIG. 8, for example. With such a shape, it becomes possible to allow repulsion to act more sensitively against the rotation 21 of the movable section 5.

Figure 14:
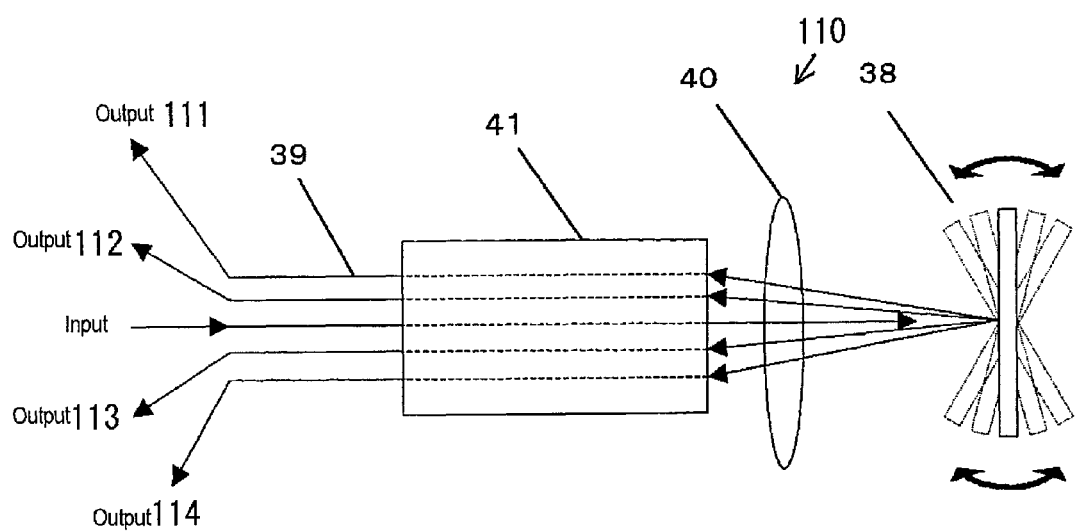
FIG. 14 is a plan view showing an optical-fiber type 4-channel optical switch according to an embodiment of the present invention.

Next, an optical-fiber type 4-channel optical switch incorporating the actuator 38 will be described. FIG. 14 is a plan view showing an optical-fiber type 4-channel optical switch 110. The optical switch 110 includes the actuator 38, a collimating lens 40, and an optical fiber array 41 in which five optical fibers 39 are fixed into an array, and is constructed as an optical switch having one input and four outputs.

Light entering an optical fiber 39 that corresponds to the input is collimated into a substantially parallel light beam by the collimating lens 40 so as to enter the actuator 38. By adjusting the pivot position of the movable section 5 of the actuator 38 so that light having been reflected from the actuator 38 enters an optical fiber 39 that corresponds to one of the outputs 111, 112, 113, and 114, a 4-channel optical switch operation can be realized.

Note that the optical-fiber type 4-channel optical switch construction shown in FIG. 14 is only exemplary, and is not limiting. For example, the optical switch 110 may include the bi-axial pivoting type actuator 34 shown in FIG. 9, in which case an optical switch with a greater number of channels can be realized by arranging the optical fibers 39 into a two-dimensional array.

Moreover, by arranging the pivot axis of the movable section 5 of the actuator 34 so as to be coaxial with the pivot axis of the intermediate frame portion 25, for example, the movable section 5 may be allowed to pivot to a greater extent in one direction, in which case a greater number of optical fibers 39 can be arrayed.

Moreover, by arranging the pivot axis of the actuator 34 of the movable section 5 so as to be coaxial with the pivot axis of the intermediate frame portion 25, it becomes possible to reduce the driving voltage for the actuator 34, thus realizing a low voltage driving.

Moreover, the actuator 38 may be used as an optical scanning section of an optical-scanning type image projection apparatus, a laser printer, a scanner, a bar-code reader, an optical-scanning type sensor system, or the like, for example.

Moreover, although the actuator 38 utilizes a repulsion occurring between electric charges of the same polarity, it would also be possible to utilize a magnetic repulsion occurring between opposing constituent elements of the same magnetic pole.

Embodiment 3

Figure 15:
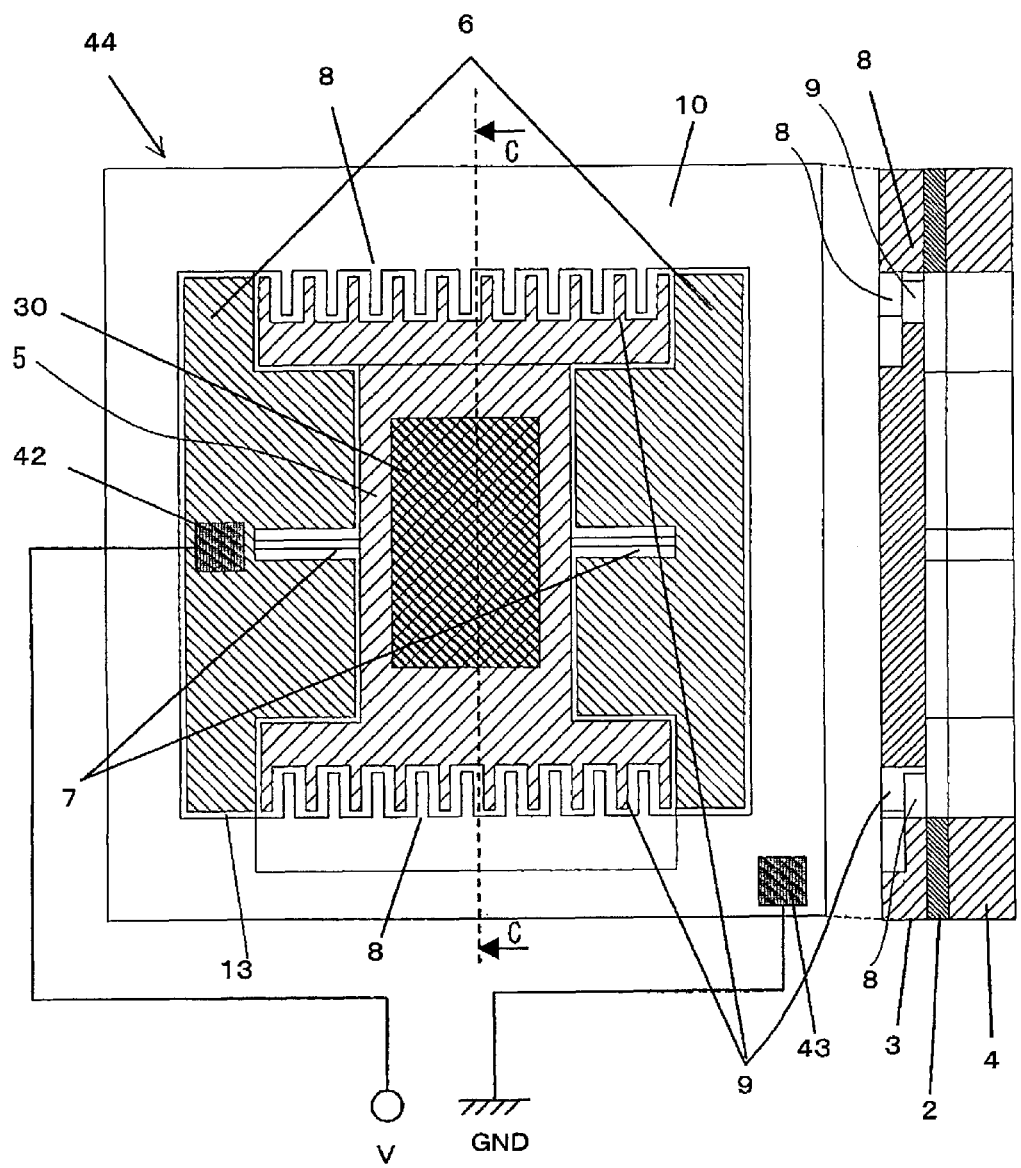
FIG. 15 is a plan view and a cross-sectional view showing an actuator according to an embodiment of the present invention.

FIG. 15 is a diagram showing a mono-axial pivoting type actuator 44 according to a third embodiment of the present invention. At the left-hand side of FIG. 15 is shown a plan view of the actuator 44; at the right-hand side is shown a cross-sectional view corresponding to a C-C cross section in the plan view.

With reference to FIG. 15, the actuator 44 is produced by processing a wafer in which two silicon layers are bonded via an insulating layer 2 of silicon dioxide ($SiO_2$), i.e., a so-called SOI (Silicon On Insulator) wafer.

Among the two silicon layers, a first silicon layer is doped with an n type impurity such as P or As and a p type impurity such as B so that an electrical conductivity is conferred thereto, and thus is referred to as a device layer 3. A second silicon layer is a thick portion that constitutes a main portion of the wafer, and is referred to as a handle layer 4. By subjecting the device layer 3 to an etching-based patterning, a movable section 5, hinges 7, and a stationary section 10 are formed. The movable section 5 of the actuator 44 includes an optical filter portion 30.

Via the hinges 7, the anchor portions 6 link to and support the movable section 5, such that the movable section 5 is capable of pivoting around the hinges 7 as an axis. Each movable comb electrode 9 is formed along a far edge, from the pivot axis, of the outer periphery of the movable section 5. The stationary section 10 includes stationary comb electrodes 8 which mesh with the movable comb electrodes 9 each with a gap therebetween.

In the actuator 44, along the thickness direction of the device layer 3, one of the stationary comb electrodes 8 is situated below the corresponding movable comb electrode 9. The other stationary comb electrode 8, located on the opposite side of the pivot axis, is situated above the corresponding movable comb electrode 9 along the thickness direction of the device layer 3. Such a structure can be formed by performing two steps of etching in a Deep-RIE etching process.

A movable electrode pad 42 is provided on an anchor portion 6. A ground pad 43 is provided on the stationary section 10. When the ground pad 43 is set to the ground level (GND) and a driving voltage V is applied to the movable electrode pad 42, the voltage V applied to the movable electrode pad 42 defines a potential difference between the movable comb electrodes 9 and the stationary comb electrodes 8.

The edge portions of the movable comb electrodes 9 lying adjacent to the anchor portions 6 correspond to the edge portions of the movable section 5 that are the farthest from the center of the movable section 5. Edge portions of the anchor portions 6 extend adjacent and in parallel to these edge portions of the movable comb electrodes 9. Adjacent edge portions extend so as to be at a constant distance from each other. A portion of the gap between the movable section 5 and each anchor portion 6 is narrower than a gap along a direction parallel to the pivot axis of the movable section 5 between one combtooth of each movable comb electrode 9 and one combtooth of the corresponding stationary comb electrode 8. The anchor portions 6 function as a repulsion generation section for generating a repulsion acting between the movable section 5 and the stationary section 10.

Isolation trenches 13 are formed in the device layer 3, so that the constituent elements are electrically isolated by the isolation trenches 13 as necessary. The anchor portions 6 are electrically isolated from the stationary comb electrodes 8. The anchor portions 6, the hinges 7, and the movable section 5 are electrically connected.

With a repulsion generated by applying the same driving voltage V to the movable section 5 and the anchor portions 6, the movable section 5 can operate stably. The movable section 5 pivots relative to the stationary section 10 around the hinges 7, whereby light having been reflected from the optical filter portion 30 of the movable section 5 is subjected to one-dimensional scanning. By setting an arbitrary potential difference between the stationary comb electrodes 8 and the movable comb electrodes 9, the movable section 5 is allowed to pivot to an arbitrary position.

Note that the shapes of the movable section 5 and the anchor portions 6 shown in FIG. 15 are only exemplary, and are not limiting. For example, as shown in FIG. 6, the gap between the movable section 5 and each anchor portion 6 may not be constant, but tapered so that, when a rotation 21 occurs, a narrowed constant gap will exist between the movable section 5 and each anchor portion 6 having come closer together. With such shapes, a repulsion can be uniformly generated across a broad range when the movable section 5 and the anchor portions 6 have come closer together.

Moreover, portions of the movable section 5 may be shaped so as to extend into the anchor portions 6 as shown in FIG. 7 and FIG. 8, for example. With such a shape, it becomes possible to allow repulsion to act more sensitively against the rotation 21 of the movable section 5.

Figure 16:
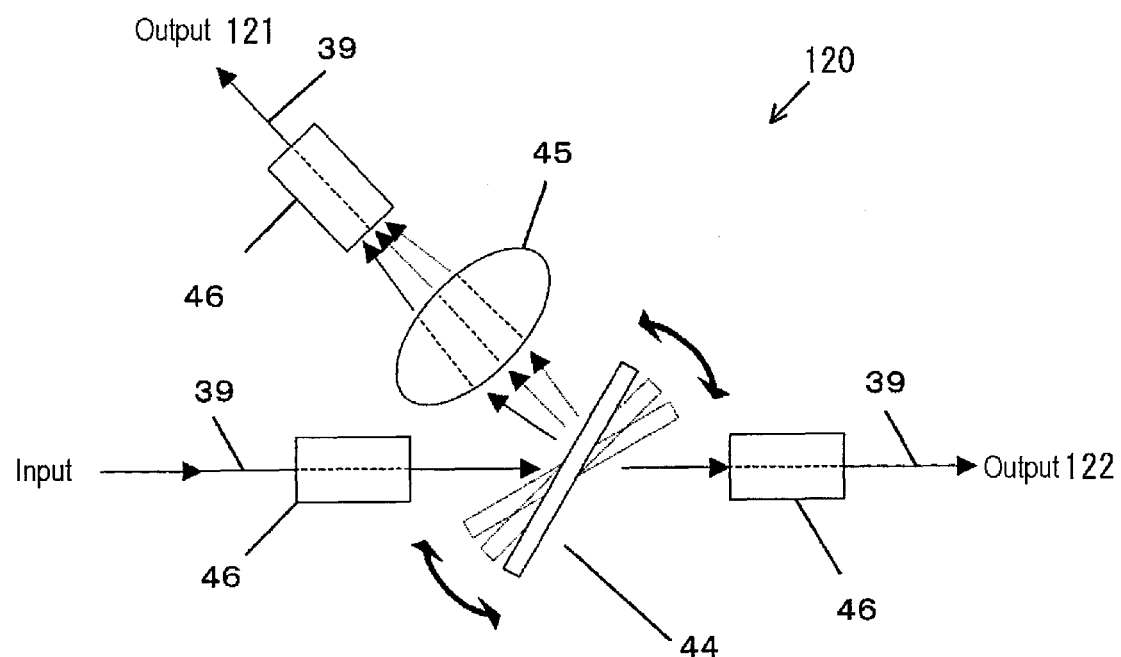
FIG. 16 is a plan view showing an optical branching filter according to an embodiment of the present invention.

Next, an optical branching filter having the actuator 44 will be described. FIG. 16 is a plan view showing an optical branching filter 120. The optical branching filter 120 includes an optical fiber 39, the actuator 44, a lens 45, and an optical fiber collimator 46. Depending on the angle of light which enters the optical filter portion 30 of the actuator 44, the characteristics of the light reflected or transmitted by the optical filter portion 30 change.

Reflected light from the light which obliquely enters the optical filter portion 30 of the actuator 44 from the incident-side collimator 46 has its optical path adjusted by the lens 45, and enters the collimator 46, whereby an output 121 is obtained. Transmitted light of the light which obliquely enters the optical filter portion 30 of the actuator 44 enters the collimator 46, whereby an output 122 is obtained. Thus, an optical branching filter action is obtained.

Note that the pivoting direction of the movable section 5 may be restricted to one direction. In this case, all of the generated driving force can be used in the same pivoting direction, so that the optical branching filter 120 can be driven at a lower voltage than by the bi-directional pivoting scheme.

Note that the construction of the optical branching filter 120 shown in FIG. 16 is only exemplary, and is not limiting. For example, the optical branching filter 120 may include the bi-axial pivoting type actuator 34 shown in FIG. 9, in which case the optical fibers in the collimator 46 may be arranged in a two-dimensional array to realize an optical switch with a greater number of channels. In the case where the optical branching filter 120 includes the actuator 34, the movable section 5 of the actuators 34 includes the optical filter portion 30.

Moreover, by arranging the pivot axis of the movable section 5 of the actuator 34 so as to be coaxial with the pivot axis of the intermediate frame portion 25, for example, the optical filter portion 30 of the movable section may be allowed to pivot to a greater extent in one direction. In this case, an optical branching filter having a further wider band is obtained.

Moreover, by arranging the pivot axis of the actuator 34 of the movable section 5 so as to be coaxial with the pivot axis of the intermediate frame portion 25, it becomes possible to reduce the driving voltage for the actuator 34, thus realizing a low voltage driving.

Moreover, a construction may be adopted where either one of reflected light or transmitted light from the optical filter portion 30 of the movable section 5 is obtained as an output in response to an input.

Moreover, although the actuator 44 utilizes a repulsion occurring between electric charges of the same polarity, it would also be possible to utilize a magnetic repulsion occurring between opposing constituent elements of the same magnetic pole.

Embodiment 4

Figure 17:
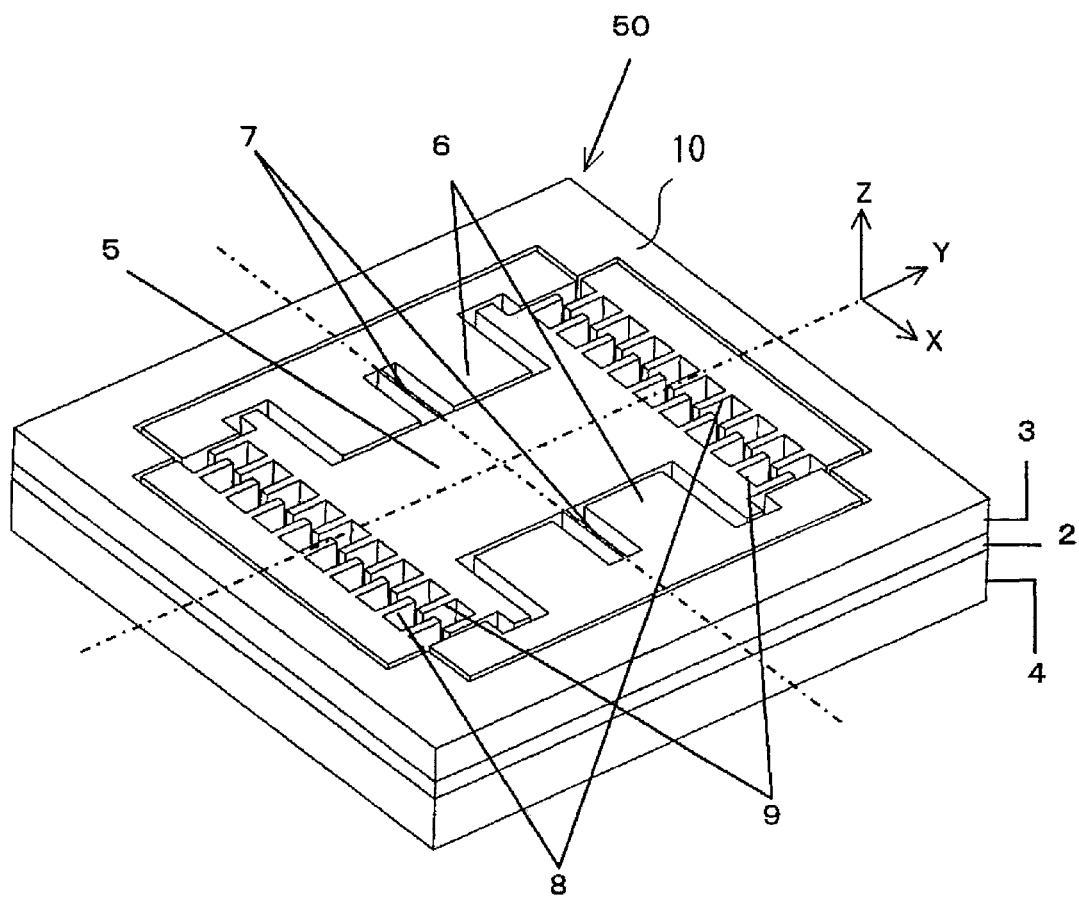
FIG. 17 is a perspective view showing an actuator according to an embodiment of the present invention.
Figure 18:
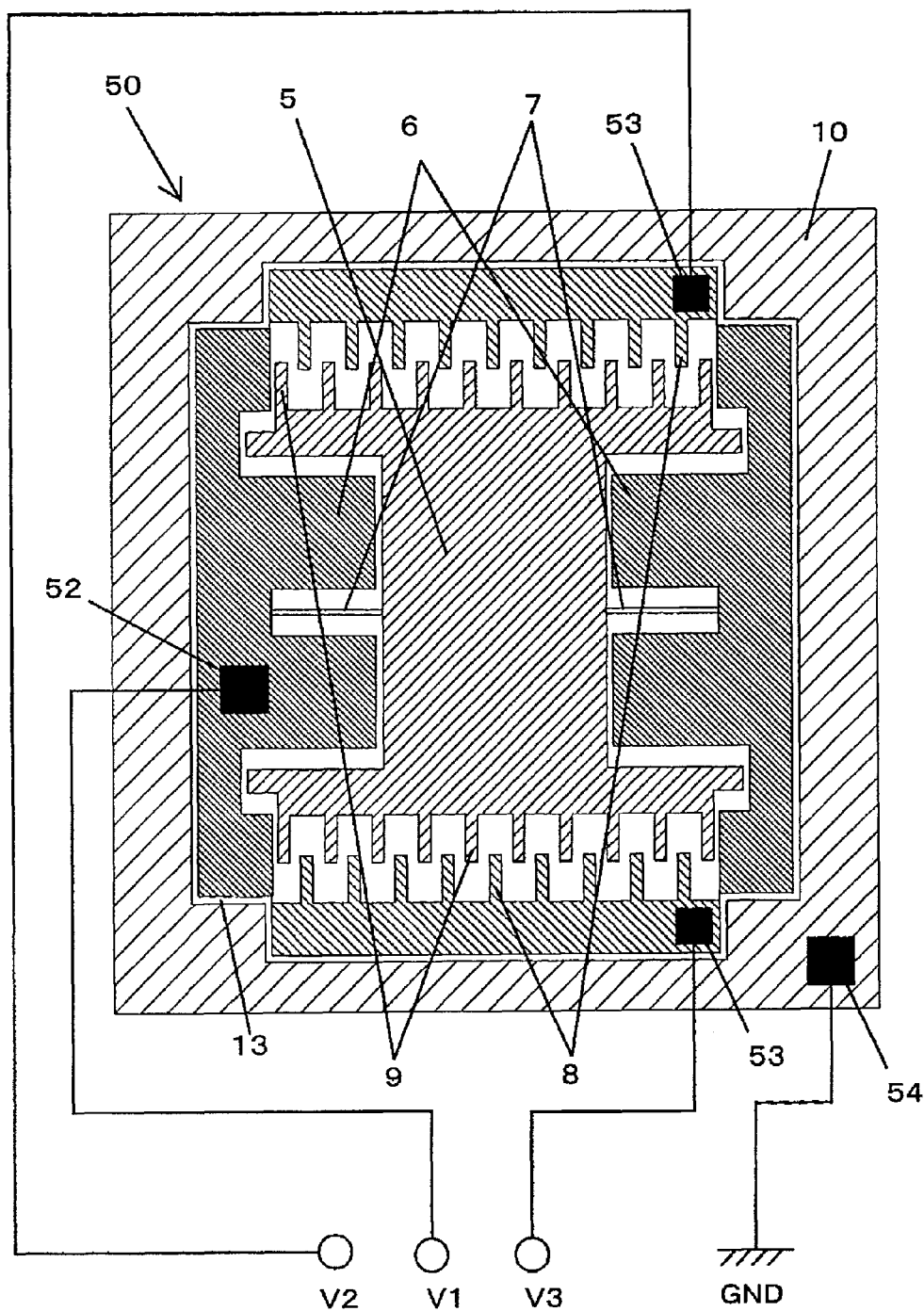
FIG. 18 is a plan view showing an actuator according to an embodiment of the present invention.

FIG. 17 is a perspective view showing a mono-axial translation-type actuator 50 according to a fourth embodiment of the present invention. FIG. 18 is a plan view showing the actuator 50.

The actuator 50 is produced by processing a wafer in which two silicon layers are bonded via an insulating layer 2 of silicon dioxide ($SiO_2$), i.e., a so-called SOI (Silicon On Insulator) wafer.

Among the two silicon layers, a first silicon layer is doped with an n type impurity such as P or As and a p type impurity such as B so that an electrical conductivity is conferred thereto, and thus is referred to as a device layer 3. A second silicon layer is a thick portion that constitutes a main portion of the wafer, and is referred to as a handle layer 4. By subjecting the device layer 3 to an etching-based patterning, the movable section 5, the hinges 7, and the stationary section 10 are formed. The movable section 5 of the actuator 50 undergoes a reciprocal linear motion along a direction (Y direction) which is perpendicular to the direction (X direction) in which the hinges 7 extend.

Via the hinges 7, the anchor portions 6 link to and support the movable section 5, such that the movable section 5 is capable of translation while being supported by the hinges 7. Each movable comb electrode 9 is formed along a far edge, from the hinges 7, of the outer periphery of the movable section 5. The stationary section 10 includes stationary comb electrodes 8 which mesh with the movable comb electrodes 9 each with a gap therebetween. The two stationary comb electrodes 8 are electrically isolated from each other, such that respectively different voltages can be independently applied thereto.

Isolation trenches 13 are formed in the device layer 3, so that the constituent elements are electrically isolated by the isolation trenches 13 as necessary. The stationary comb electrodes 8 are electrically isolated from the outer frame portion of the stationary section 10. Also, the two stationary comb electrodes 8 are electrically isolated from each other. The anchor portions 6, the hinges 7, and the movable section 5 are electrically connected.

The edge portions of the movable comb electrodes 9 lying adjacent to the anchor portions 6 correspond to the edge portions of the movable section 5 that are the farthest from the center of the movable section 5. Edge portions of the anchor portions 6 extend adjacent and in parallel to these edge portions of the movable comb electrodes 9. Adjacent edge portions extend so as to be at a constant distance from each other. A portion of the gap between the movable section 5 and each anchor portion 6 is narrower than a gap, along a direction parallel to the direction in which the hinges 7 extend, between one combtooth of each movable comb electrode 9 and one combtooth of the corresponding stationary comb electrode 8. The anchor portions 6 function as a repulsion generation section for generating a repulsion acting between the movable section 5 and the stationary section 10.

A stationary electrode pad 53 is provided on each of the stationary comb electrodes 8. A movable electrode pad 52 is provided on an anchor portion 6. A ground pad 54 is provided in the portion of the stationary section 10 other than the anchor portions 6 and the stationary comb electrodes 8 (i.e., (the outer frame portion). A driving voltage V1 is applied to the movable electrode pad 52. A driving voltage V2 is applied to one of the two stationary electrode pads 53, whereas a driving voltage V3 is applied to the other. The ground pad 54 is set to the ground level (GND). A potential difference between the driving voltage V1 and the driving voltage V2, or a potential difference between the driving voltage V1 and the driving voltage V3, defines a potential difference between each movable comb electrode 9 and the corresponding stationary comb electrode 8.

Figure 19:
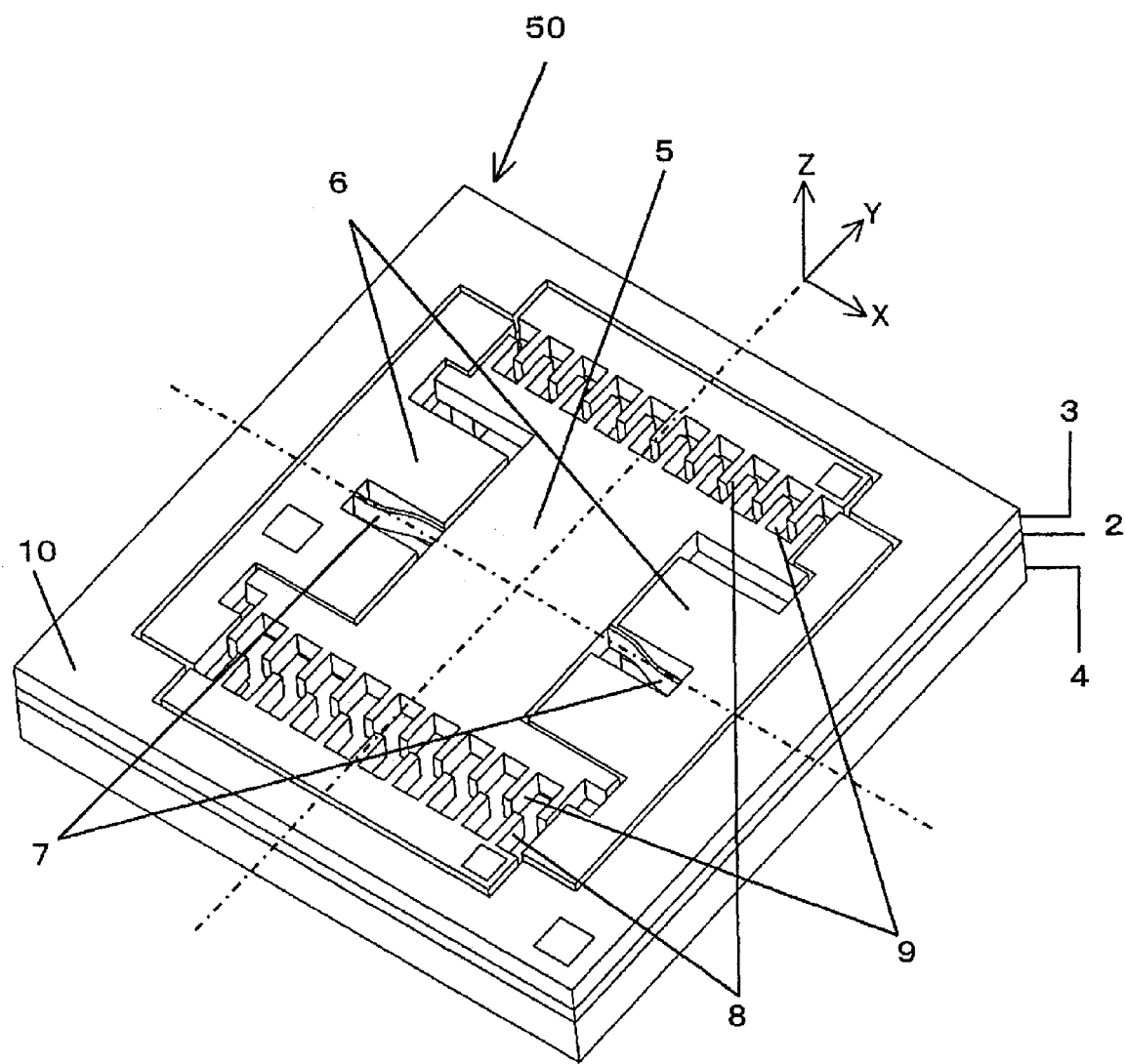
FIG. 19 is a perspective view showing an actuator according to an embodiment of the present invention which is in operation.

By setting arbitrary potential differences between the stationary comb electrodes 8 and the movable comb electrodes 9, the movable section 5 is allowed to translate in two directions (i.e., back and forth) along the Y direction. The movable section 5 can be moved to an arbitrary position as shown in FIG. 19. FIG. 19 is a perspective view showing the actuator 50 in operation. In the example shown in FIG. 19, the movable section 5 has translated along the Y direction.

With a repulsion generated by applying the same driving voltage V1 to the movable section 5 and the anchor portions 6, the movable section 5 can operate stably. Thus, with a device structure which is obtained through the simple production process of through-etching the device layer 3 to form the isolation trenches 13, the mal-operation of the movable section 5 can be suppressed.

By shaping the anchor portions 6 so as to be symmetric with respect to an axis along the hinges 7, a uniform repulsion can be generated with respect to this axis, so that the movable section 5 is allowed to operate more stably.

Moreover, along the direction (Y direction) which is parallel to the translation direction of the movable section 5, the distance between each anchor portion 6 and each portion of the movable section 5 that opposes that anchor portion 6 is equal to or less than the distance between each movable comb electrode 9 and the corresponding stationary comb electrode 8. As a result, even if the movable section 5 is caused to make a large translation, the movable section 5 will come in contact with the anchor portion(s) 6 before contact between the comb electrodes can occur, so that sticking between the comb electrodes can be prevented.

Figure 20:
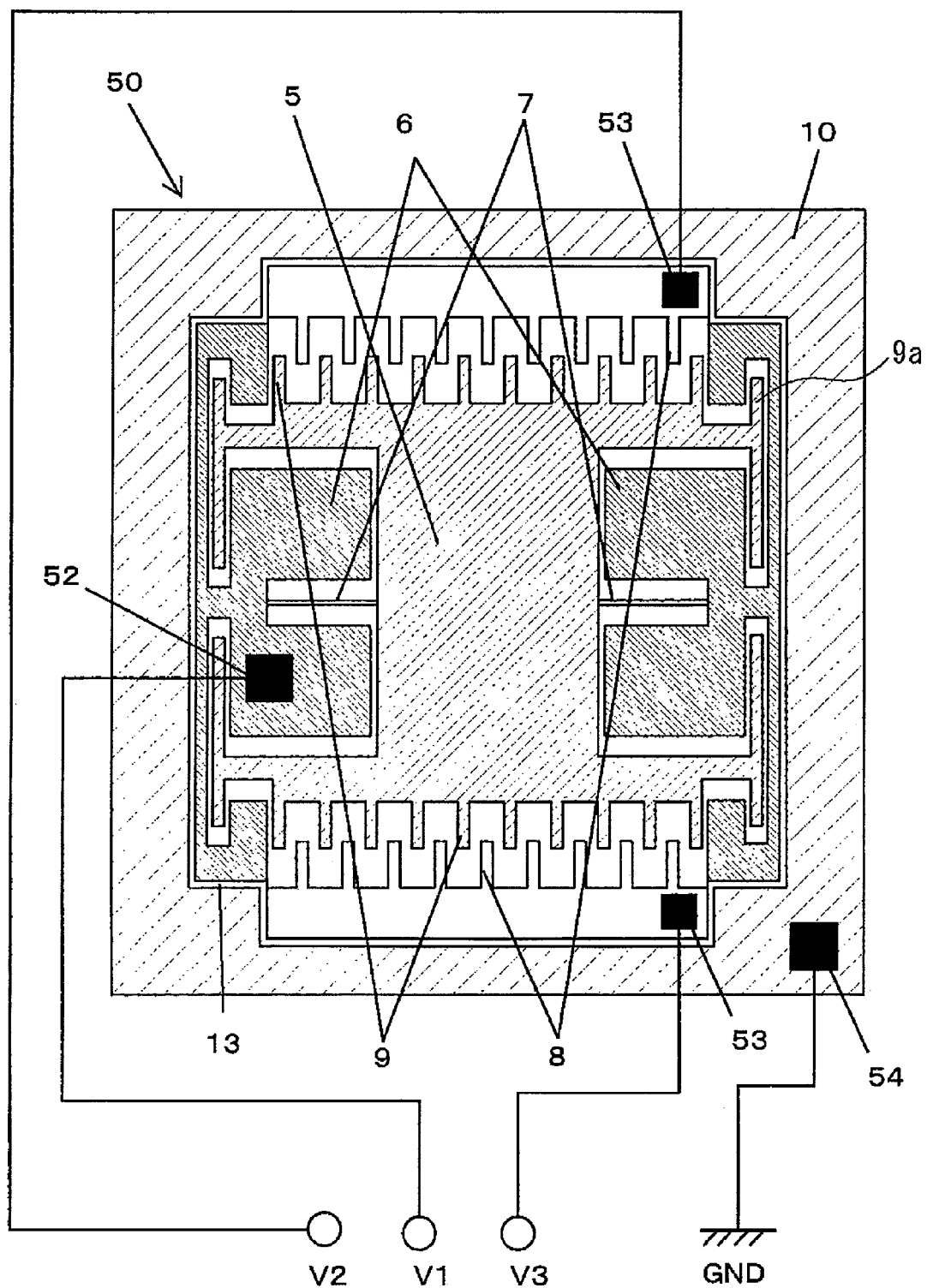
FIG. 20 is a plan view an actuator according to an embodiment of the present invention.

Note that the shapes of the movable section 5 and the anchor portions 6 shown in FIG. 17 are only exemplary, and are not limiting. With reference to FIG. 20, another example of the shapes of the movable section 5 and the anchor portions 6 will be described. FIG. 20 is a plan view showing the actuator 50. In the example shown in FIG. 20, the movable section 5 has portions 9a which extend farther away from the center of the movable section 5, each of whose perimeter is surrounded by an anchor portion 6. This makes it possible to allow repulsion to act more sensitively against the mal-operation of the movable section 5.

Note that the construction shown in FIG. 17 is only exemplary, and is not limiting. For example, the actuator 50 may have the intermediate frame portion 25 shown in FIG. 9. In this case, for example, by allowing the movable section 5 to translate along the X direction and the intermediate frame portion 25 to translate along the Y direction, light can be subjected to two-dimensional scanning. Moreover, the hinges supporting the movable section 5 and the hinges supporting the intermediate frame portion 25 may be formed so as to extend along the same direction. By allowing the movable section 5 and the intermediate frame portion 25 to simultaneously move in the same direction in such a construction, the movable distance of the movable section 5 relative to the stationary section 10 can be made longer.

Moreover, the movable section 5 may be pivoted by appropriately controlling the driving voltages to be applied to the actuator 50.

Moreover, although the actuator 50 utilizes a repulsion occurring between electric charges of the same polarity, it would also be possible to utilize a magnetic repulsion occurring between opposing constituent elements of the same magnetic pole.

Embodiment 5

Figure 21:
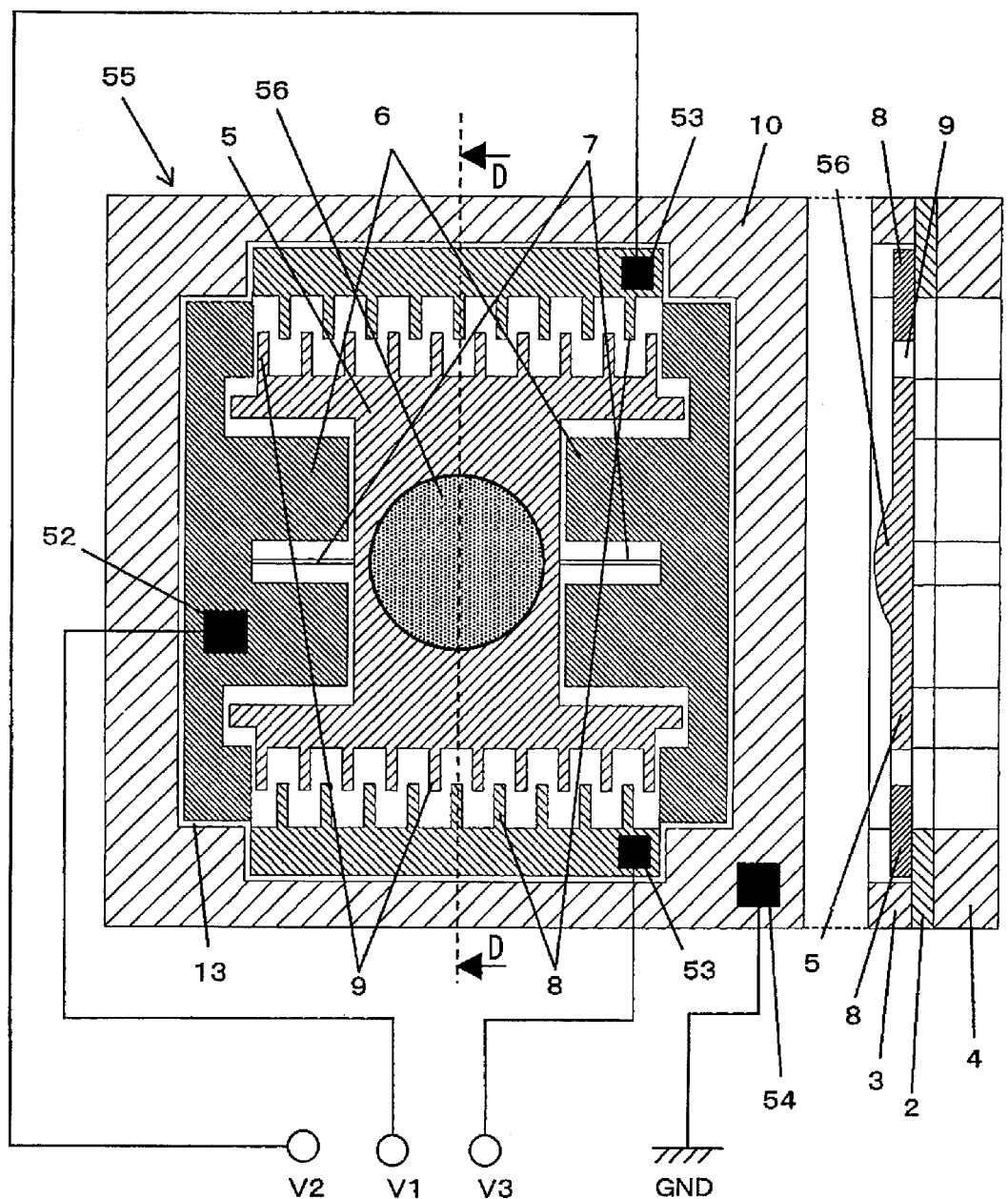
FIG. 21 is a plan view and a cross-sectional view showing an actuator according to an embodiment of the present invention.

FIG. 21 is a diagram showing a mono-axial translation-type actuator 55 according to a fifth embodiment of the present invention. At the left-hand side of FIG. 21 is shown a plan view of the actuator 55; at the right-hand side is shown a cross-sectional view corresponding to a D-D cross section in the plan view.

The actuator 55 is produced by processing a wafer in which two silicon layers are bonded via an insulating layer 2 of silicon dioxide ($SiO_2$), i.e., a so-called SOI (Silicon On Insulator) wafer.

Among the two silicon layers, a first silicon layer is doped with an n type impurity such as P or As and a p type impurity such as B so that an electrical conductivity is conferred thereto, and thus is referred to as a device layer 3. A second silicon layer is a thick portion that constitutes a main portion of the wafer, and is referred to as a handle layer 4. By subjecting the device layer 3 to an etching-based patterning, a movable section 5, hinges 7, and a stationary section 10 are formed. The movable section 5 of the actuator 55 includes a lens portion 56.

Via the hinges 7, the anchor portions 6 link to and support the movable section 5, such that the movable section 5 is capable of translation while being supported by the hinges 7.

Each movable comb electrode 9 is formed along a far edge, from the hinges 7, of the outer periphery of the movable section 5. The stationary section 10 includes stationary comb electrodes 8 which mesh with the movable comb electrodes 9 each with a gap therebetween. The two stationary comb electrodes 8 are electrically isolated from each other, such that respectively different voltages can be independently applied thereto.

Isolation trenches 13 are formed in the device layer 3, so that the constituent elements are electrically isolated by the isolation trenches 13 as necessary. The stationary comb electrodes 8 are electrically isolated from the outer frame portion of the stationary section 10. Also, the two stationary comb electrodes 8 are electrically isolated from each other. The anchor portions 6, the hinges 7, and the movable section 5 are electrically connected.

The edge portions of the movable comb electrodes 9 lying adjacent to the anchor portions 6 correspond to the edge portions of the movable section 5 that are the farthest from the center of the movable section 5. Edge portions of the anchor portions 6 extend adjacent and in parallel to these edge portions of the movable comb electrodes 9. Adjacent edge portions extend so as to be at a constant distance from each other. A portion of the gap between the movable section 5 and each anchor portion 6 is narrower than a gap, along a direction parallel to the direction in which the hinges 7 extend, between one combtooth of each movable comb electrode 9 and one combtooth of the corresponding stationary comb electrode 8. The anchor portions 6 function as a repulsion generation section for generating a repulsion acting between the movable section 5 and the stationary section 10.

A stationary electrode pad 53 is provided on each of the stationary comb electrodes 8. A movable electrode pad 52 is provided on an anchor portion 6. A ground pad 54 is provided in the portion of the stationary section 10 other than the anchor portions 6 and the stationary comb electrodes 8 (i.e., (the outer frame portion). A driving voltage V1 is applied to the movable electrode pad 52. A driving voltage V2 is applied to one of the two stationary electrode pads 53, whereas a driving voltage V3 is applied to the other. The ground pad 54 is set to the ground level (GND). A potential difference between the driving voltage V1 and the driving voltage V2, or a potential difference between the driving voltage V1 and the driving voltage V3, defines a potential difference between each movable comb electrode 9 and the corresponding stationary comb electrode 8.

By setting arbitrary potential differences between the stationary comb electrodes 8 and the movable comb electrodes 9, the movable section 5 is allowed to translate in two directions (i.e., back and forth), whereby the light traveling through the lens portion 56 is subjected to one-dimensional scanning.

With a repulsion generated by applying the same driving voltage V1 to the movable section 5 and the anchor portions 6, the movable section 5 can operate stably. Thus, with a device structure which is obtained through the simple production process of through-etching the device layer 3 to form the isolation trenches 13, the mal-operation of the movable section 5 can be suppressed.

Note that the construction shown in FIG. 21 is only exemplary, and is not limiting. For example, portions of the movable section 5 may be shaped so as to extend into the anchor portions 6 as shown in FIG. 20. With such a shape, it becomes possible to allow repulsion to act more sensitively against the mal-operation of the movable section 5.

Moreover, the actuator 55 may have the intermediate frame portion 25 shown in FIG. 9, for example. In this case, for example, by allowing the movable section 5 to translate along a predetermined direction and allowing the intermediate frame portion 25 to translate along a direction which is perpendicular to that predetermined direction, light traveling through the lens portion 56 can be subjected to two-dimensional scanning.

Moreover, the hinges supporting the movable section 5 and the hinges supporting the intermediate frame portion 25 may be formed so as to extend along the same direction. By allowing the movable section 5 and the intermediate frame portion 25 to simultaneously move in the same direction in such a construction, the movable distance of the movable section 5 relative to the stationary section 10 can be made longer. This makes it possible to subject the light traveling through the lens portion 56 to a broad range of scanning.

Moreover, by forming the hinges supporting the movable section 5 and the hinges supporting the intermediate frame portion 25 so as to extend along the same direction and allowing the movable section 5 and the intermediate frame portion 25 to simultaneously move in the same direction, it becomes possible to reduce the driving voltage for the actuator 55, thus realizing a low voltage driving.

Moreover, the movable section 55 may be pivoted by appropriately controlling the driving voltages to be applied to the actuator 50.

Moreover, although the actuator 55 utilizes a repulsion occurring between electric charges of the same polarity, it would also be possible to utilize a magnetic repulsion occurring between opposing constituent elements of the same magnetic pole.

Embodiment 6

Figure 22:
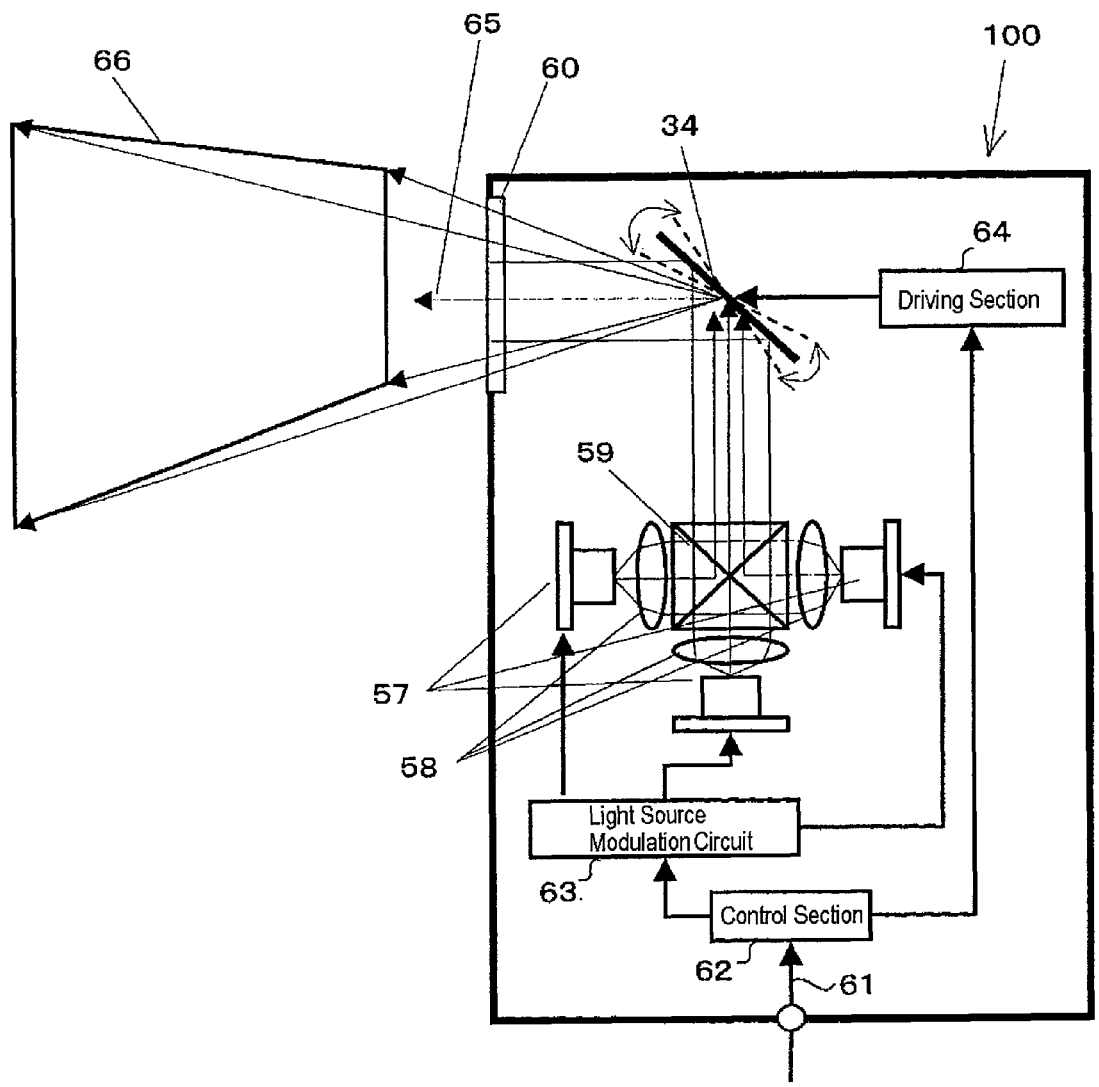
FIG. 22 is a diagram showing an image projection apparatus according to an embodiment of the present invention.

FIG. 22 is a diagram showing an image projection apparatus 100 according to a sixth embodiment of the present invention.

The image projection apparatus 100 includes an actuator 34, light sources 57, collimating lenses 58, a dichroic prism 59, a control section 62, a light source modulation circuit 63, and a driving section 64. The movable section 5 of the actuator 34 includes a mirror surface, and functions as an optical scanning section for performing scanning with light. The collimating lenses 58 and the dichroic prism 59 are optics for guiding the light beams having been emitted from the light sources 57 to the actuator 34.

In accordance with an image signal 61 which is input to the image projection apparatus 100, the control section 62 controls the operation of the light source modulation circuit 63 and the driving section 64. The driving section 64 drives the actuator 34 by applying driving voltages to the actuator 34. The light source modulation circuit 63 generates a modulation signal which is in accordance with the image signal 61, and the three light sources 57 respectively emit light beams 65 of red (R), green (G), and blue (B) in accordance with the modulation signal.

The light beams 65 are collimated by the collimating lens 58 into substantially parallel light beams, and merged by the dichroic prism 59 so as to be incident to the actuator 34. The light beam 65 which is incident to the actuator 34 and reflected therefrom is subjected to two-dimensional scanning by the actuator 34, and emitted through the aperture 60 so as to display an image in a projection region 66.

Thus, by using the actuator 34 having an excellent driving stability as an optical scanning section of the optical-scanning type image projection apparatus 100, it becomes possible to obtain a small and inexpensive optical-scanning type image projection apparatus which has a high operational stability.

Note that the construction of the image projection apparatus 100 is only exemplary, and is not limiting. For example, pivoting around one of the two pivoting axes of the optical scanning section may be realized with the actuator 1, while pivoting around the other axis may be realized with a polygon mirror. Alternatively, bi-axial pivoting may be realized by using two actuators 1. Furthermore, optical elements for merging or dividing light, a projection lens, and the like may be further incorporated within the optical scanning section.

The present invention is especially useful in technological fields that involve changing of a direction of light travel. For example, the present invention is useful for optical scanning apparatuses for use in laser printers and the like, reading apparatuses such as bar-code readers, laser projectors, and so on.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-132498 filed on May 18, 2007 and No. 2008-124564 filed on May 12, 2008, the entire contents of which are hereby incorporated by reference.

What is claimed is:

1. An actuator comprising:
   a movable section;
   a stationary section for supporting the movable section;
   a driving electrode portion for driving the movable section; and
   a repulsion generation section for generating a repulsion acting between the movable section and the stationary section,
   wherein, the driving electrode portion includes
   a first comb electrode provided in the movable section and
   a second comb electrode being provided in the stationary section and opposing the first comb electrode; and
   a portion of a gap between the movable section and the repulsion generation section is narrower than a gap between the first comb electrode and the second comb electrode along a direction which is parallel to a pivot axis of the movable section.

2. The actuator of claim 1, wherein,
   the repulsion generation section is provided at a position of the stationary section opposing the movable section; and
   the repulsion is generated by applying a same voltage to the movable section and to the repulsion generation section.

3. The actuator of claim 1, wherein the repulsion acts in a direction of suppressing rotation of the movable section around an axis which is perpendicular to a planar direction of the movable section.

4. The actuator of claim 1, further comprising a hinge for linking the movable section and the stationary section, wherein,
   the driving electrode portion includes
   a first comb electrode provided in the movable section and
   a second comb electrode being provided in the stationary section and opposing the first comb electrode; and
   at least a portion of the repulsion generation section opposes an end of the movable section that is located closer to the first comb electrode than to the hinge.

5. The actuator of claim 1, wherein at least a portion of the repulsion generation section opposes an end of the movable section that is the farthest from a center of the movable section.

6. An actuator comprising:
a movable section;
a stationary section for supporting the movable section;
a driving electrode portion for driving the movable section;
a repulsion generation section for generating a repulsion acting between the movable section and the stationary section, and
a hinge for linking the movable section and the stationary section,
wherein, the driving electrode portion includes
a first comb electrode provided in the movable section and
a second comb electrode being provided in the stationary section and opposing the first comb electrode; and
a portion of a gap between the movable section and the repulsion generation section is narrower than a gap between the first comb electrode and the second comb electrode along a direction which is parallel to a pivot axis of the movable section, and
wherein at least a portion of the movable section has elasticity, and when the movable section comes into contact with the repulsion generation section, an elastic force is generated in a direction of separating the movable section from the repulsion generation section, and
wherein the repulsion generation section extends across the entire length of the movable section along a direction perpendicular to a direction in which the hinge extends.

7. The actuator of claim 1, wherein the repulsion generation section is symmetric with respect to a pivot axis of the movable section.

8. The actuator of claim 1, further comprising a hinge for linking the movable section and the stationary section, wherein,
the driving electrode portion includes
a first comb electrode provided in the movable section and
a second comb electrode being provided in the stationary section and opposing the first comb electrode;
the movable section translates along a direction perpendicular to a direction in which the hinge extends; and
a portion of a gap between the movable section and the repulsion generation section is narrower than a gap between the first comb electrode and the second comb electrode along a direction parallel to the direction in which the hinge extends.

9. The actuator of claim 8, wherein, along a direction which is parallel to a translation direction of the movable section, a distance between the repulsion generation section and a portion of the movable section opposing the repulsion generation section is equal to or less than a distance between the first comb electrode and the second comb electrode.

10. The actuator of claim 8, wherein the repulsion generation section is symmetric with respect to an axis extending along the hinge.

11. The actuator of claim 1, wherein the repulsion generation section surrounds a portion of the movable section.

12. The actuator of claim 1, wherein the stationary section surrounds the movable section.

13. The actuator of claim 1, wherein at least a portion of the movable section is formed of a plate-like silicon layer.

14. The actuator of claim 1, wherein the stationary section is formed of an SOI wafer in which first and second silicon layers are bonded together via an insulating layer.

15. An image projection apparatus comprising:
the actuator of claim 1;
a light source for emitting a light beam;
optics for guiding the light beam to the actuator; and
a driving section for driving the actuator.

* * * * *